（12) United States Patent
Xia

(10) Patent No.: US 11,721,042 B2
(45) Date of Patent: Aug. 8, 2023

(54) TARGET DETECTION METHOD, ELECTRONIC DEVICE AND MEDIUM

(71) Applicant: APOLLO INTELLIGENT CONNECTIVITY (BEIJING) TECHNOLOGY CO., LTD., Beijing (CN)

(72) Inventor: Chunlong Xia, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/561,242

(22) Filed: Dec. 23, 2021

(65) Prior Publication Data

US 2022/0114759 A1    Apr. 14, 2022

(30) Foreign Application Priority Data

Dec. 25, 2020   (CN) .......................... 202011564385.6

(51) Int. Cl.
*G06T 7/80* (2017.01)
*G06V 20/54* (2022.01)
(Continued)

(52) U.S. Cl.
CPC ................ *G06T 7/80* (2017.01); *G06V 10/24* (2022.01); *G06V 10/255* (2022.01); *G06V 10/82* (2022.01);
(Continued)

(58) Field of Classification Search
CPC . G06T 7/80; G06T 2207/20081; G06V 20/54; G06V 10/24; G06V 10/82; G06V 10/255; G06V 20/647; G06V 2201/07
See application file for complete search history.

(56) References Cited

U.S. PATENT DOCUMENTS

2013/0182906 A1*  7/2013  Kojo ...................... G01C 11/06
                                                                382/103
2019/0179006 A1*  6/2019  Baba ....................... G06V 20/58
(Continued)

FOREIGN PATENT DOCUMENTS

CN         110032949 A       7/2019
CN         110070025 A       7/2019
(Continued)

OTHER PUBLICATIONS

Mousavian, Arsalan et al., "3D Bounding Box Estimation Using Deep Learning and Geometry", Dec. 2016, 11 pages. https://www.researchgate.net/publication/311411005.
(Continued)

*Primary Examiner* — Syed Haider
(74) *Attorney, Agent, or Firm* — Seed IP Law Group LLP

(57) ABSTRACT

A target detection method, an electronic device, a roadside device and a cloud control platform are provided and relate to the technical field of intelligent transportation. The target detection method includes acquiring a detection image of a target to be detected, wherein the detection image is an image taken by a detection monocular camera for the target to be detected; extracting position information of the target to be detected by inputting the detection image into a target detection model, wherein the target detection model extracts the position information of the target to be detected from the detection image, and the position information of the target to be detected comprising pixel coordinates of a projection, on an image plane of the detection monocular camera, of a center point of an orthographic projection of the target to be detected on a ground where the target to be detected is located and determining a three-dimensional position of the target to be detected based on the position information of the target to be detected.

20 Claims, 19 Drawing Sheets

(51) Int. Cl.
*G06V 10/24* (2022.01)
*G06V 10/82* (2022.01)
*G06V 10/20* (2022.01)
*G06V 20/64* (2022.01)

(52) U.S. Cl.
CPC ............ *G06V 20/54* (2022.01); *G06V 20/647* (2022.01); *G06T 2207/20081* (2013.01); *G06V 2201/07* (2022.01)

(56) References Cited

U.S. PATENT DOCUMENTS

| | | | |
|---|---|---|---|
| 2019/0286153 A1* | 9/2019 | Rankawat | ................ G06N 3/08 |
| 2020/0082207 A1 | 3/2020 | Xie et al. | |
| 2020/0110175 A1* | 4/2020 | Chen | ....................... G01S 17/89 |
| 2020/0265601 A1* | 8/2020 | Uchida | ..................... G06T 7/70 |
| 2020/0285863 A1* | 9/2020 | Sadjadi | ..................... G06T 7/73 |

FOREIGN PATENT DOCUMENTS

| | | |
|---|---|---|
| CN | 110427917 A | 11/2019 |
| CN | 111126269 A | 5/2020 |
| CN | 111310574 A | 6/2020 |
| CN | 111814548 A | 10/2020 |
| CN | 112101209 A | 12/2020 |

OTHER PUBLICATIONS

Bochkovskiy et al., "YOLOv4: Optimal Speed and Accuracy of Object Detection," arXiv:2004.10934v1 [cs.CV], Apr. 23, 2022, (17 pages).

Wu et al., "Stable Pose Tracking from a Planar Target with an Analytical Motion Model in Real-time Applications," 2014 IEEE 16th International Workshop on Multimedia Signal Processing, Jakarta, Indonedia, Sep. 22-24, 2014, (6 pages).

* cited by examiner

TARGET DETECTION METHOD, ELECTRONIC DEVICE AND MEDIUM

CROSS-REFERENCE TO RELATED APPLICATIONS

This application claims the benefit of Chinese Patent Application No. 202011564385.6, titled "TARGET DETECTION METHOD, ELECTRONIC DEVICE, ROADSIDE DEVICE AND CLOUD CONTROL PLATFORM" filed on Dec. 25, 2020. The contents of the applications are hereby incorporated by reference in their entireties for all purposes.

BACKGROUND

Technical Field

The present disclosure relates to the technical field of intelligent transportation, in particular to a computer vision and deep learning technology. Specifically, the present disclosure provides a target detection method, an electronic device, a roadside device and a cloud control platform.

Description of the Related Art

An intelligent transportation system effectively and comprehensively applies an information technology, a data communication technology, a sensor technology, an electronic control technology, a computer technology and the like to the whole transportation management system, thereby establishing a real-time, accurate and efficient comprehensive transportation and management system which functions in a large-scale and all-round way. The intelligent transportation system which has been widely used includes an airport and station passenger flow dispersion system, an urban traffic intelligent dispatching system, an expressway intelligent dispatching system, an operating vehicle dispatching management system, an automatic motor vehicle control system and the like. The intelligent transportation system improves the transportation efficiency through the harmonious and close cooperation of people, vehicles and roads, relieves traffic jam, improves the road network passing capacity, reduces traffic accidents, reduces energy consumption and abates environmental pollution.

The detection and recognition of a target based on an image is a research direction of great interest in the technical field of intelligent transportation. In many computer vision application fields including smart cities, intelligent transportation and the like, the estimation of a target position plays a crucial role. In the related art, there is still much room for improvement in the technical solution for detecting a position of a target based on the image.

A method described in this part is not necessarily a method that has been previously conceived or adopted. Unless otherwise stated, it should not be assumed that any method described in this part is considered as the prior art simply by virtue of its inclusion in this part. Similarly, unless otherwise stated, the problem mentioned in this part should not be considered recognized in any prior art.

BRIEF SUMMARY

The present disclosure provides a target detection method, an electronic device, a roadside device and a cloud control platform.

According to an aspect of the present disclosure, provided is a target detection method, including: acquiring a detection image of a target to be detected, wherein the detection image is an image taken by a detection monocular camera for the target to be detected; acquiring a target detection model, wherein the target detection model is configured to extract position information of the target to be detected from the detection image, and the position information of the target to be detected includes a pixel coordinate of a projection, on an image plane of the detection monocular camera, of a center point of an orthographic projection of the target to be detected on a ground where the target to be detected is located; inputting the detection image into the target detection model to extract the position information of the target to be detected; and determining a three-dimensional position of the target to be detected based on the position information of the target to be detected.

According to an aspect of the present disclosure, provided is a training method for a target detection model, including: acquiring training data, wherein the training data includes a training image taken by a monocular camera for a target; constructing a basic model, wherein the basic model includes a multi-layer convolutional neural network configured to extract position information of the target from the training image, and the position information of the target includes a pixel coordinate of a projection, on an image plane of the monocular camera, of a center point of an orthographic projection of the target on a ground where the target is located; and training the basic model by the training data to obtain a target detection model.

According to an aspect of the present disclosure, provided is a target detection apparatus, including: a first acquisition unit configured to acquire a detection image of a target to be detected, wherein the detection image is an image taken by a detection monocular camera for the target to be detected; a second acquisition unit configured to acquire a target detection model, wherein the target detection model is configured to extract position information of the target to be detected from the detection image, and the position information of the target to be detected includes a pixel coordinate of a projection, on an image plane of the detection monocular camera, of a center point of an orthographic projection of the target to be detected on a ground where the target to be detected is located; an input unit configured to input the detection image into the target detection model to extract the position information of the target to be detected; and a determination unit configured to determine a three-dimensional position of the target to be detected based on the position information of the target to be detected.

According to an aspect of the present disclosure, provided is a training apparatus for a target detection model, including: a third acquisition unit configured to acquire training data, wherein the training data includes a training image taken by a monocular camera for a target; a construction unit configured to construct a basic model, wherein the basic model includes a multi-layer convolutional neural network configured to extract position information of the target from the training image, and the position information of the target includes a pixel coordinate of a projection, on an image plane of the monocular camera, of a center point of an orthographic projection of the target on a ground where the target is located; and a training unit configured to train the basic model by the training data to obtain a target detection model.

According to an aspect of the present disclosure, provided is an electronic device, including: a memory, a processor, and a computer program stored on the memory, wherein the processor is configured to execute the computer program to implement steps of the above method.

According to an aspect of the present disclosure, provided is a non-transitory computer-readable storage medium having a computer program stored thereon, wherein the computer program, when executed by a processor, implements steps of the above method.

According to an aspect of the present disclosure, provided is a computer program product, including a computer program, wherein the computer program, when executed by a processor, implements steps of the above method.

According to an aspect of the present disclosure, provided is a roadside device, including the above-mentioned electronic device.

According to an aspect of the present disclosure, provided is a cloud control platform, including the above-mentioned electronic device.

The beneficial technical effects brought by the technical solutions provided by the embodiments of the present disclosure are at least as follows:

Based on monocular vision, a target detection model capable of extracting two-dimensional information of a target is acquired, and then three-dimensional information of the target is predicted. Moreover, the detection method does not depend on the external parameters between a camera and a scene, thereby increasing the scope of applicable scenes for target detection.

It should be understood that the content described in this part is neither intended to identify key or important features of the embodiments of the present disclosure, nor intended to limit the scope of the present disclosure. Other features of the present disclosure will be easily understood through the following description.

BRIEF DESCRIPTION OF THE SEVERAL VIEWS OF THE DRAWINGS

The accompanying drawings illustrate examples of the embodiments and constitute a part of the specification, and are used to explain example implementations of the embodiments together with the text description of the specification. The illustrated embodiments are for illustrative purposes only and do not limit the scope of claims. In all the drawings, the same reference numbers refer to similar but not necessarily the same elements.

DETAILED DESCRIPTION

Figure 1:
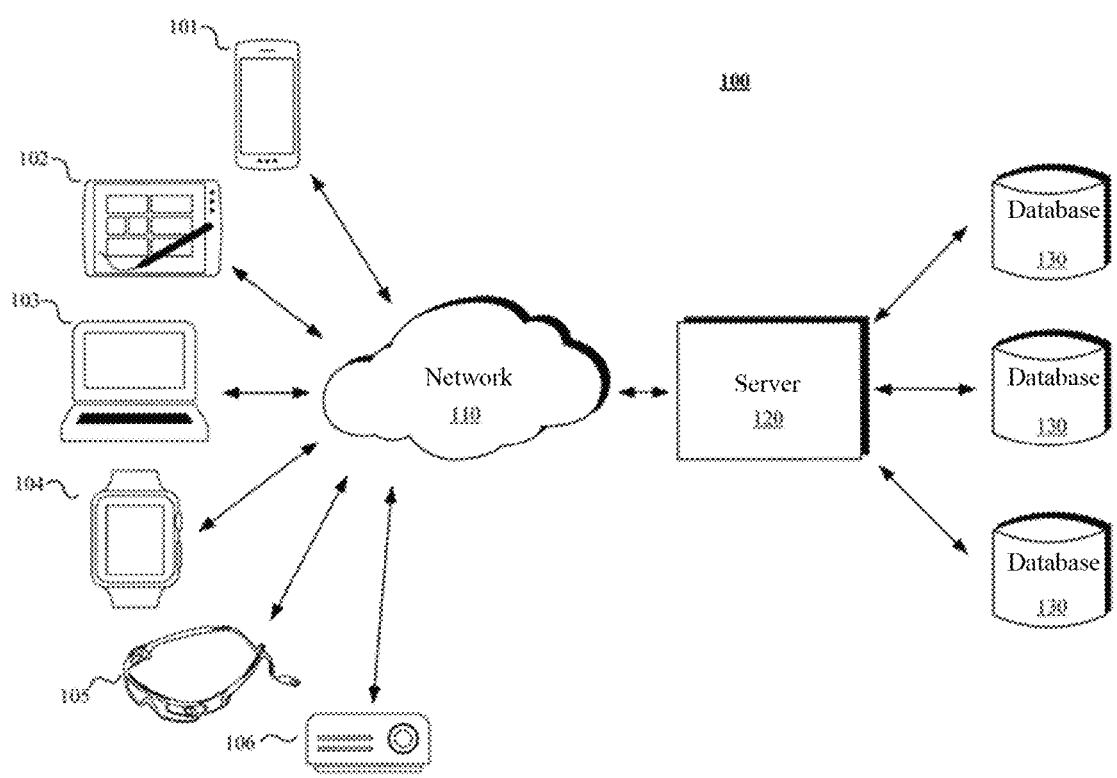
FIG. 1 shows a schematic diagram of an example system in which various methods described herein can be implemented according to an embodiment of the present disclosure.

Example embodiments of the present disclosure are described below with reference to the drawings, wherein various details of the embodiments of the present disclosure facilitate understanding, and should be regarded as merely examples. Therefore, those of ordinary skill in the art should recognize that various changes and modifications can be made to the embodiments described herein without departing from the scope of the present disclosure. Likewise, for the sake of clarity and conciseness, the description of well-known functions and structures is omitted in the following description.

In the present disclosure, unless otherwise stated, the use of the terms "first," "second," etc., to describe various elements is not intended to limit the positional relationship, timing relationship or importance relationship of these elements. Such terms are only used for distinguishing one element from another. In some examples, a first element and a second element may refer to the same instance of the elements, and in some cases, based on the description of the context, they may also refer to different instances.

The terms used in the description of the various examples in the present disclosure are only for the purpose of describing specific examples, and are not intended to be limiting. Unless otherwise specified explicitly in the context, if the number of elements is not specifically limited, there may be one or more elements. In addition, the term "and/or" used in the present disclosure covers any one of the listed items and all possible combinations.

In the field of three-dimensional detection on a target, there is a point-cloud-based target detection method, a binocular-based target detection method, and a monocular-based target detection method at the same time. Monocular-based three-dimensional detection has become a popular research direction due to cost and utilization factors.

In the related art, the monocular-based three-dimensional target detection method directly predicts three-dimensional position information of a target, including three-dimensional coordinates of a center point of the target, scale information of the target, and posture information of the target. The method is more sensitive to external parameters around a camera due to the use of the three-dimensional coordinate information of the target when a prediction model is generated. The model performs well in a scene with similar distribution to a training set. However, in the case of different camera installation positions or different surrounding environment information, the prediction of the model becomes unreliable. In addition, it is difficult to collect and calibrate a training set for three-dimensional target detection, thus resulting in a data set without large size. A target detection algorithm in the related art is also a data-driven algorithm, so directly training the model using three-dimensional information is difficult to have a good generalization effect.

The present disclosure provides the following technical solutions for optimization methods by redesigning training regression parameters based on a target detection model for computer vision and deep learning.

The embodiments of the present disclosure will be described in detail below with reference to the drawings.

FIG. 1 shows a schematic diagram of an example system 100 in which various methods and apparatuses described herein can be implemented according to an embodiment of the present disclosure. Referring to FIG. 1, the system 100 includes one or more client devices 101, 102, 103, 104, 105 and 106, a server 120, and one or more communication networks 110 that couple the one or more client devices to the server 120. The client devices 101, 102, 103, 104, 105 and 106 may be configured to execute one or more applications.

In an embodiment of the present disclosure, the server 120 may run one or more services or software applications that enable a training method for a target detection model and a target detection method in the present disclosure to be executed.

In some embodiments, the server 120 may also provide other services or software applications that may include non-virtual environments and virtual environments. In some embodiments, these services can be provided as web-based services or cloud services, for example, provided to users of the client devices 101, 102, 103, 104, 105 and/or 106 under a software as a service (SaaS) model.

In the configuration shown in FIG. 1, the server 120 may include one or more components that implement the functions performed by the server 120. These components may include software components, hardware components or combinations thereof that can be executed by one or more processors. A user operating the client devices 101, 102, 103, 104, 105 and/or 106 may interact with the server 120 by using one or more client applications in turn to use services provided by these components. It should be understood that a variety of different system configurations are possible, which may be different from the system 100. Therefore, FIG. 1 is an example of a system for implementing the various methods described herein, and is not intended to be limiting.

The user can use the client devices 101, 102, 103, 104, 105 and/or 106 to interact with a target detection model. The client device may provide an interface that enables the user of the client device to interact with the client device. The client device may further output information to the user via the interface. Although FIG. 1 only depicts six types of client devices, those skilled in the art will understand that the present disclosure can support any number of client devices.

The client devices 101, 102, 103, 104, 105 and/or 106 may include various types of computer devices, such as portable handheld devices, general-purpose computers (such as personal computers and laptop computers), workstation computers, wearable devices, game systems, thin clients, various messaging devices, sensors or other sensing devices, etc. In some embodiments, the client devices 101, 102, 103, 104, 105 and/or 106 may also include roadside devices. These computer devices may run various types and versions of software applications and operating systems, such as Microsoft Windows, Apple iOS, UNIX-like operating systems, Linux or Linux-like operating systems (such as Google Chrome OS); or include various mobile operating systems, such as Microsoft Windows Mobile OS, iOS, Windows Phone and Android. The portable handheld devices may include cellular phones, smart phones, tablet computers, personal digital assistants (PDAs), etc. The wearable devices may include head-mounted displays and other devices. The game systems may include various handheld game devices, Internet-enabled game devices, etc. The client device can execute various applications, such as various Internet-related applications, communication applications (such as email applications), short message service (SMS) applications, and may use various communication protocols.

The network 110 may be any type of network well known to those skilled in the art, and may use any one of a variety of available protocols (including but not limited to TCP/IP, SNA, IPX, etc.) to support data communication. For example only, one or more networks 110 may be a local area network (LAN), an Ethernet-based network, a token ring, a wide area network (WAN), the Internet, a virtual network, a virtual private network (VPN), an intranet, an extranet, a Public Switched Telephone Network (PSTN), an infrared network, a wireless network (such as Bluetooth, WIFI) and/or any combination of these and/or other networks.

The server 120 may include one or more general-purpose computers, dedicated server computers (for example, PC (Personal Computer) servers, UNIX servers, mid-range servers), blade servers, mainframe computers, server clusters, or any other suitable arrangement and/or combination. The server 120 may include one or more virtual machines running a virtual operating system, or other computing architectures involving virtualization (for example, one or more flexible pools of logical storage devices that may be virtualized to maintain virtual storage devices of the server). In some embodiments, the server 120 may also include a cloud control platform. In various embodiments, the server 120 may run one or more services or software applications that provide the functions described below.

A computing unit in the server 120 may run one or more operating systems including any of the above-mentioned operating systems and any commercially available server operating systems. The server 120 may also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105 and 106. The server 120 may also include one or more applications to display data feeds and/or real-time events via one or more display devices of the client devices 101, 102, 103, 104, 105 and 106.

In some implementations, the server 120 may be a server of a distributed system, or a server combined with a blockchain. The server 120 may also be a cloud server, or an intelligent cloud computing server or an intelligent cloud host with an artificial intelligence technology. The cloud server is a host product in the cloud computing service system to solve the defects of difficult management and weak business scalability in services of a traditional physical host and a Virtual Private Server (VPS).

The system 100 may also include one or more databases 130. In some embodiments, these databases can be used for storing data and other information. For example, one or more of the databases 130 may be used for storing information such as audio files and video files. The databases 130 may reside in various positions. For example, a data repository used by the server 120 may be local to the server 120, or may be remote from the server 120 and may communicate with the server 120 via a network-based or dedicated connection. The databases 130 may be of different types. In some embodiments, the data repository used by the server 120 may be a database, such as a relational database. One or more of these databases may store, update, and retrieve data to and from the databases in response to a command.

In some embodiments, one or more of the databases 130 may also be used by an application to store application data. The database used by the application may be of different types, such as a key-value repository, a target repository or a regular repository supported by a file system.

Figure 2:
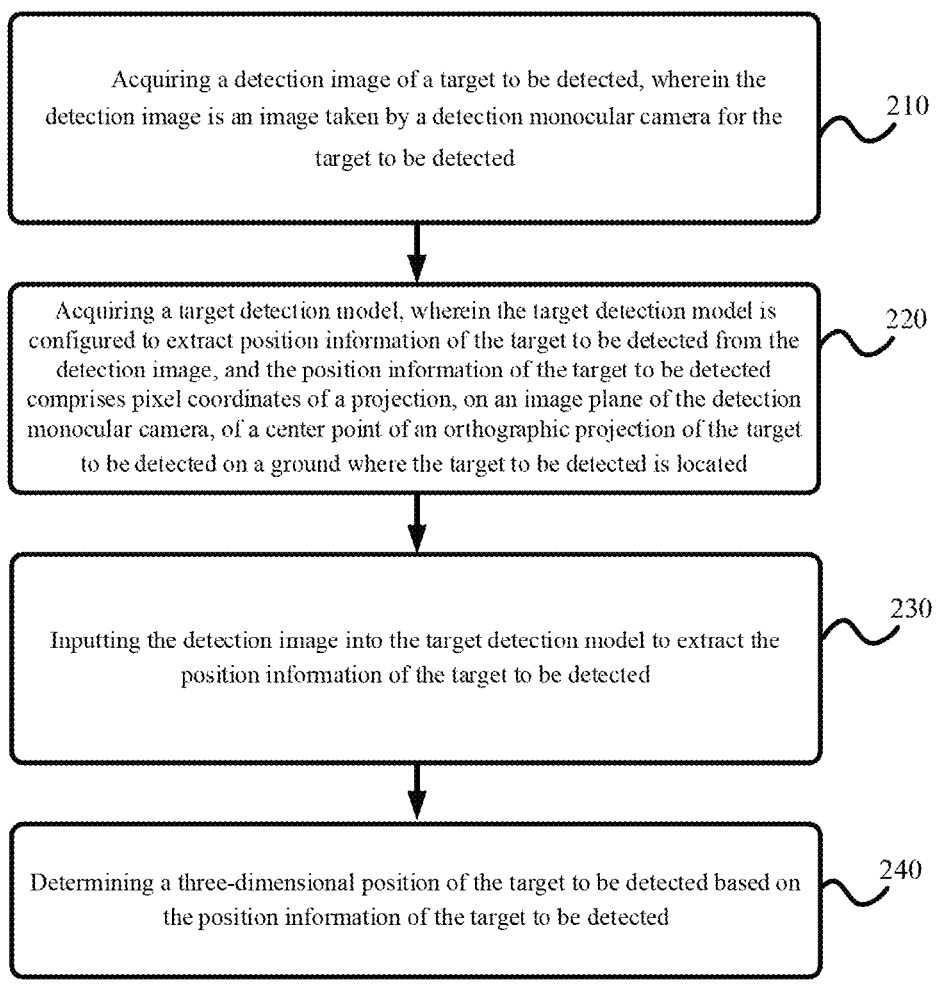
FIG. 2 shows a flowchart of a target detection method according to an embodiment of the present disclosure.

FIG. 2 shows a flowchart of a target detection method 200 according to an embodiment of the present disclosure. The method 200 may be executed at a client device (for example, any one of the client devices 101 to 106 shown in FIG. 1), that is, an execution subject of each step of the method 200 may be any one of the client devices 101 to 106 shown in FIG. 1. In some embodiments, the method 200 may be executed at a server (for example, the server 120 shown in FIG. 1). In some embodiments, the method 200 may be executed by a combination of a client device (for example, any one of the client devices 101 to 106) and a server (for example, the server 120). Taking the execution subject as the server 120 as an example, each step of the method 200 is described in detail below.

As shown in FIG. 2, the target detection method 200 includes step 210 to step 240.

Step 210, a detection image of a target to be detected is acquired, wherein the detection image is an image taken by a detection monocular camera for the target to be detected.

Step 220, a target detection model is acquired, wherein the target detection model is configured to extract position information of the target to be detected from the detection image, and the position information of the target to be detected comprises a pixel coordinate of a projection, on an image plane of the detection monocular camera, of a center point of an orthographic projection of the target to be detected on a ground where the target to be detected is located.

Step 230, the detection image is input into the target detection model to extract the position information of the target to be detected.

Step 240, a three-dimensional position of the target to be detected is determined based on the position information of the target to be detected.

For example, the position information of the target to be detected may include pixel coordinates (using pixels as unit) of an image projection point, on the image plane of the detection monocular camera, of the center point of the orthographic projection of the target to be detected on the ground, and a length, a width, a height (for example, in meters) and a yaw angle of the target to be detected.

For example, the three-dimensional position of the target to be detected may include three-dimensional coordinates of the center point of the orthographic projection of the target to be detected on the ground in a coordinate system of the detection monocular camera. For example, the three-dimensional coordinates of the center point of the orthographic projection of the target to be detected on the ground, the length, width, height, and yaw angle of the target to be detected may represent a three-dimensional bounding box of the target to be detected. For example, the position information of the target to be detected may also include a two-dimensional bounding box of an image of the target to be detected.

In summary, according to the target detection method in the embodiments of the present disclosure, the target detection model may output the coordinate position of a ground center point of a target projected onto a camera, so as to acquire the three-dimensional position of the target. Since the image coordinates output by the target detection model do not depend on the external parameters between the detection monocular camera and the application scene, the model has a good generalization ability. Therefore, the detection method using this model can use the same target detection model to detect the target to be detected in a scene with different external parameters.

Figure 3:
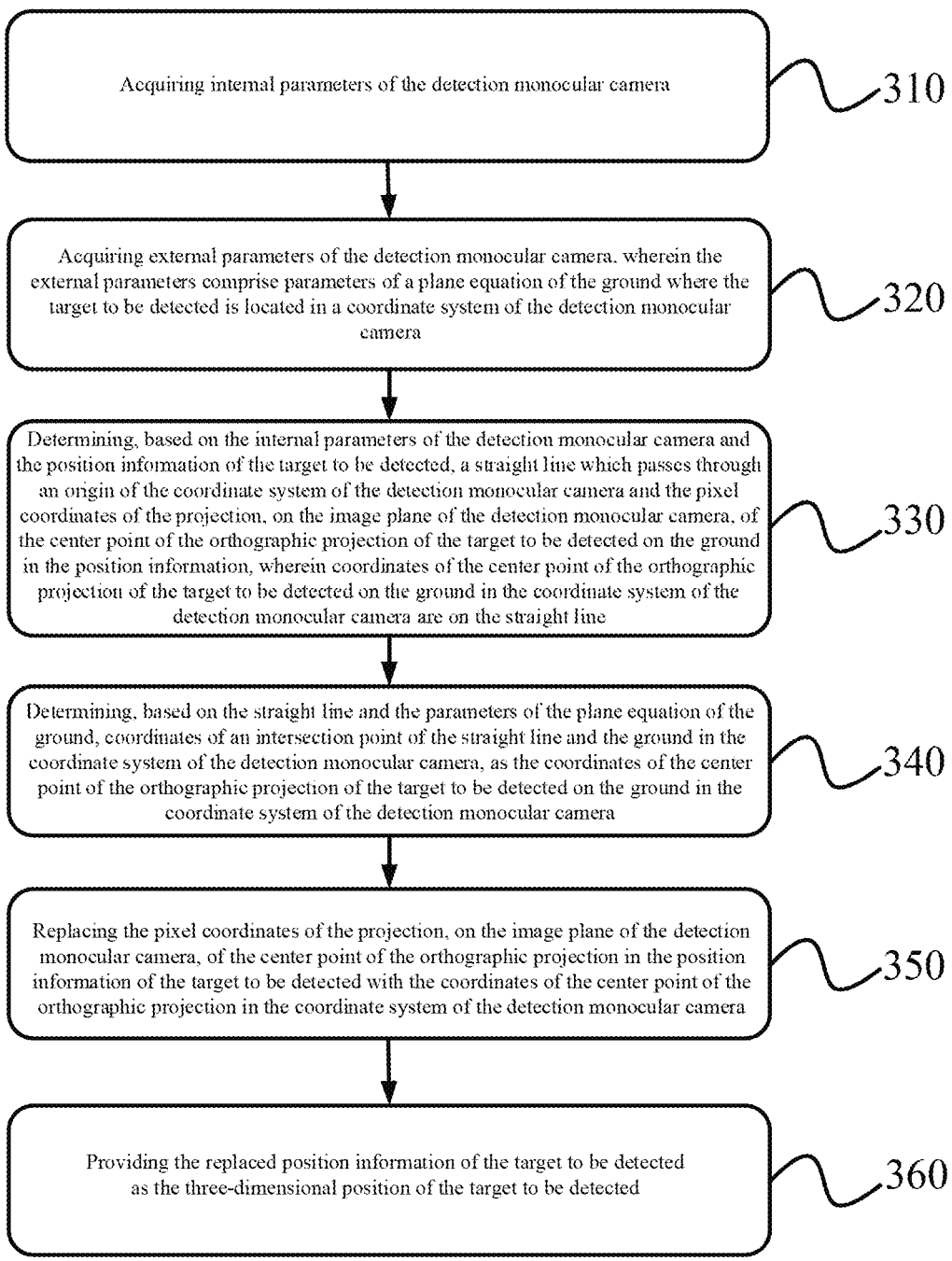
FIG. 3 shows a flowchart of an example process of determining a three-dimensional position of a target to be detected in the method of FIG. 2 according to an embodiment of the present disclosure.

FIG. 3 shows a flowchart of an example process of determining a three-dimensional position (step 240) of a target to be detected in the method 200 of FIG. 2 according to the embodiment of the present disclosure. As shown in FIG. 3, step 240 of determining the three-dimensional position of the target to be detected based on the position information of the target to be detected further includes step 310 to step 360.

Step 310, acquiring internal parameters of the detection monocular camera.

Step 320, acquiring external parameters of the detection monocular camera, wherein the external parameters include parameters of a plane equation of the ground where the target to be detected is located in the coordinate system of the detection monocular camera.

Step 330, determining, based on the internal parameters of the detection monocular camera and the position information of the target to be detected, a straight line which passes through an origin of the coordinate system of the detection monocular camera and the pixel coordinate of the projection, on the image plane of the detection monocular camera, of the center point of the orthographic projection of the target to be detected on the ground in the position information. The coordinates of the center point of the orthographic projection of the target to be detected on the ground in the coordinate system of the detection monocular camera are on the straight line.

Step 340, determining, based on the straight line and the parameters of the plane equation of the ground, a coordinate of an intersection point of the straight line and the ground in the coordinate system of the detection monocular camera as the coordinate of the center point of the orthographic projection of the target to be detected on the ground in the coordinate system of the detection monocular camera.

Step 350, replacing the pixel coordinate of the projection, on the image plane of the detection monocular camera, of the center point of the orthographic projection in the position information of the target to be detected with the coordinate of the center point of the orthographic projection in the coordinate system of the detection monocular camera.

Step 360, providing the replaced position information of the target to be detected as the three-dimensional position of the target to be detected.

Figure 4:
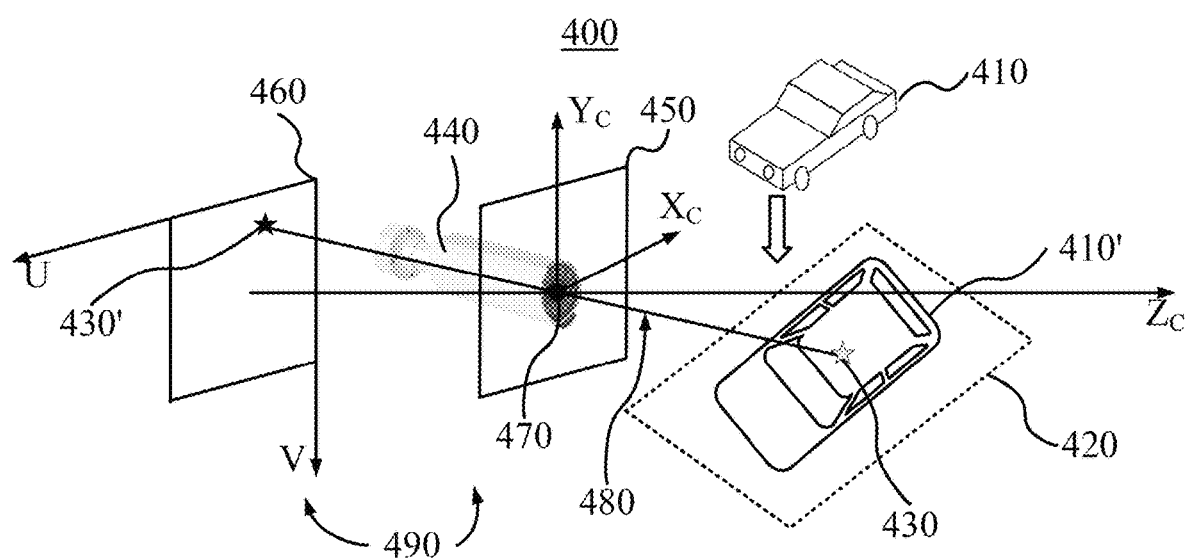
FIG. 4 shows a flowchart of an example operation of determining a three-dimensional position of a target to be detected in the process of FIG. 3 according to an embodiment of the present disclosure.

The example process shown in FIG. 3 will be described with reference to FIG. 4. FIG. 4 shows a flowchart of an example operation 400 of determining a three-dimensional position of a target to be detected in the process of FIG. 3 according to the embodiment of the present disclosure.

As shown in FIG. 4, the example operation 400 includes a target 410 to be detected and a ground plane 420. An orthographic projection of the target 410 to be detected on the ground plane 420 is 410'. The orthographic projection 410' of the target to be detected has a center point 430.

The example operation 400 also includes a detection monocular camera 440. A coordinate system 450 ($X_C$-$Y_C$-$Z_C$) of the monocular camera 440 is established by taking a focal point 470 of the detection monocular camera 440 as an origin, a direction perpendicular to the ground plane 420 as a $Y_C$ axis, a direction perpendicular to the paper surface as an $X_C$ axis, and a direction perpendicular to the $X_C$-$Y_C$ plane as a $Z_C$ axis. In addition, the detection monocular camera 440 has an image plane 460.

Further, the center point 430 of the orthographic projection 410' of the target to be detected may be projected onto the image plane 460 through the focal point 470 to obtain an image projection point 430'.

Next, the position information of the target 410 to be detected may be predicted by a trained target detection model, which will not be repeated here. In addition, the position information of the target 410 to be detected includes the pixel coordinates of the image projection point 430', onto the image plane 460, of the center point 430 of the projection 410' of the target 410 to be detected on the ground 420.

Next, internal parameters 490 of the detection monocular camera 440 can be acquired. Based on the internal parameters 490 and the pixel coordinates of the image projection point 430', an equation expression of a straight line 480 starting from the image projection point 430' and passing through the focal point 470 in the coordinate system of the detection monocular camera 440 can be obtained: ax+by=c.

Next, external parameters of the detection monocular camera 440 can be acquired. The external parameters include parameters of the plane equation of the ground 420 where the target 410 to be detected is located in the coordinate system 450 of the detection monocular camera 440. That is to say, the plane equation expression in the camera coordinate system 450: AX+BY+CZ=D. Furthermore, the various parameters of the equation expression of the ground 420 can be determined through the external parameters.

Further, it can be determined from the projection relationship that the center point 430 corresponding to the image projection point 430' is on the straight line 480. In addition, since the center point 430 is the center point of the projection 410' of the target 410 to be detected on the ground 420, the center point 430 is located in the plane of the ground 420. Therefore, an intersection point of the straight line 480 and the ground 420 is the center point 430.

Further, since the equation expressions of the straight line 480 and the ground 420 in the camera coordinate system 450 has been determined, the intersection of the two can be solved in the coordinate system 450 to obtain coordinates of the center point 430 in the coordinate system 450.

Then, the pixel coordinates of the image projection point 430' in the image plane 460 in the position information, which is extracted by the target detection model, of the target 410 to be detected are replaced with the coordinates of the center point 430 in the camera coordinate system 450.

Finally, the replaced position information of the target 410 to be detected is provided as the three-dimensional position of the target 410 to be detected.

In summary, in technical solutions of the embodiments of the present disclosure, the position information of the target to be detected is first predicted through a trained target detection model, and then according to the internal and external parameters of the camera known in advance, the three-dimensional coordinates of the center point are inferred based on the image projection coordinates of the center point. The external parameters of the camera are only used in the artificially controllable solution process, and the external parameters of the camera are not used in the uncontrollable model training. Therefore, the trained model can be combined with artificially controllable camera external parameters to detect targets in different scenes, which increases the application range of the detection method.

Figure 5:
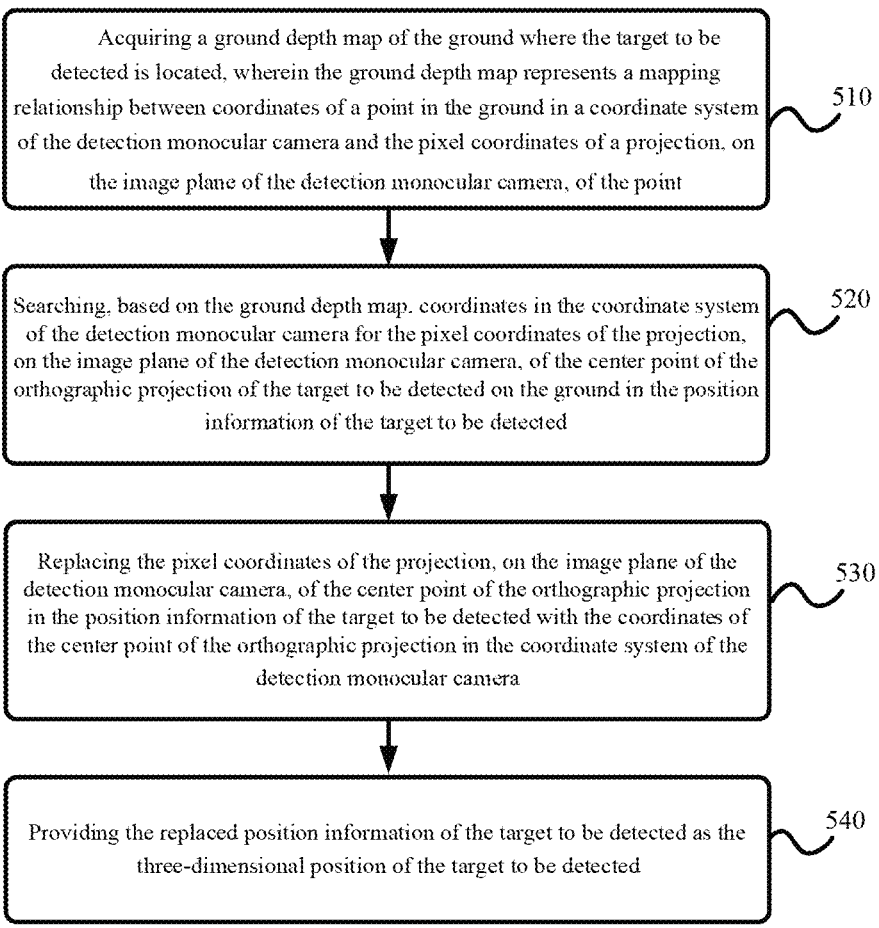
FIG. 5 shows a flowchart of another example process of determining a three-dimensional position of a target to be detected in the method of FIG. 2 according to an embodiment of the present disclosure.

FIG. 5 shows a flowchart of another example process of determining a three-dimensional position (step 240) of a target to be detected in the method 200 of FIG. 2 according to the embodiment of the present disclosure. As shown in FIG. 5, step 240 of determining the three-dimensional position of the target to be detected based on the position information of the target to be detected further includes step 510 to step 540.

Step 510, acquiring a ground depth map of the ground where the target to be detected is located, wherein the ground depth map represents a mapping relationship between a coordinate of a point in the ground in the coordinate system of the detection monocular camera and the pixel coordinates of a projection, on the image plane of the detection monocular camera, of the point.

Step 520, searching, based on the ground depth map, coordinates in the coordinate system of the detection monocular camera for the pixel coordinate of the projection, on the image plane of the detection monocular camera, of the center point of the orthographic projection of the target to be detected on the ground in the position information of the target to be detected.

Step 530, replacing the pixel coordinate of the projection, on the image plane of the detection monocular camera, of the center point of the orthographic projection in the position information of the target to be detected with the coordinate of the center point of the orthographic projection in the coordinate system of the detection monocular camera.

Step 540, providing the replaced position information of the target to be detected as the three-dimensional position of the target to be detected.

Figure 6:
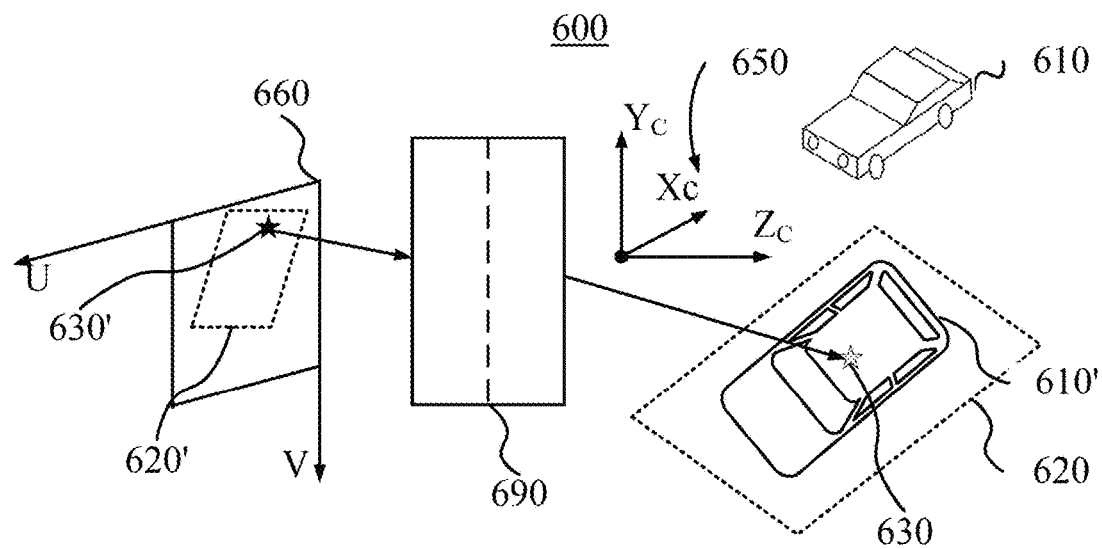
FIG. 6 shows a flowchart of an example operation of determining a three-dimensional position of a target to be detected in the process of FIG. 5 according to an embodiment of the present disclosure.

The example process shown in FIG. 5 will be described with reference to FIG. 6. FIG. 6 shows a flowchart of an example operation 600 of determining the three-dimensional position of the target to be detected in the process of FIG. 5 according to the embodiment of the present disclosure. The target 610 to be detected in FIG. 6 is the same as the target 410 to be detected in FIG. 4. Similarly, other similar reference numbers represent elements similar to those in FIG. 4, and will not be repeated here.

As shown in FIG. 6, the example operation 600 includes a ground depth map 690. The ground depth map 690 represents the mapping relationship between the coordinates of the point in the ground 620 in the coordinate system 650 of the detection monocular camera and pixel coordinates of the image projection point, on the image plane coordinate system 660 of the detection monocular camera, of the point.

That is to say, for a center point 630 of an orthographic projection 610' of the target 610 to be detected on the ground 620, the ground depth map 690 establishes a mapping relationship between coordinates of the center point 630 in the camera coordinate system 650 and pixel coordinates of an image projection point 630' in the image plane coordinate system 660.

Next, similarly, the pixel coordinates of the image projection point 630' can be obtained through a trained target detection model, which will not be repeated here.

Next, according to the pixel coordinates of the image projection point 630' in the image plane coordinate system 660, the coordinates of the center point 630 in the camera coordinate system 650 are found in the ground depth map 690.

Then, the pixel coordinates of the image projection point 630' in the image plane 660 in the position information, which is extracted by the target detection model, of the target 610 to be detected are replaced with the coordinates of the center point 630 in the camera coordinate system 650.

Finally, the replaced position information of the target 610 to be detected is provided as the three-dimensional position of the target 610 to be detected.

In summary, in technical solutions of the embodiments of the present disclosure, the three-dimensional coordinates of the center point of the target to be detected are found through the artificially controllable ground depth map, and the external parameters of the camera are not used in the uncontrollable model training. Therefore, the trained model can be combined with artificially controllable camera external parameters to detect targets in different scenes, which increases the application range of the detection method.

In some example embodiments, the three-dimensional position of the target to be detected may be a three-dimensional bounding box of the target to be detected. For example, FIG. 7 shows a schematic diagram of a structure 700 of a three-dimensional position of a target to be detected according to an embodiment of the present disclosure.

Figure 7:
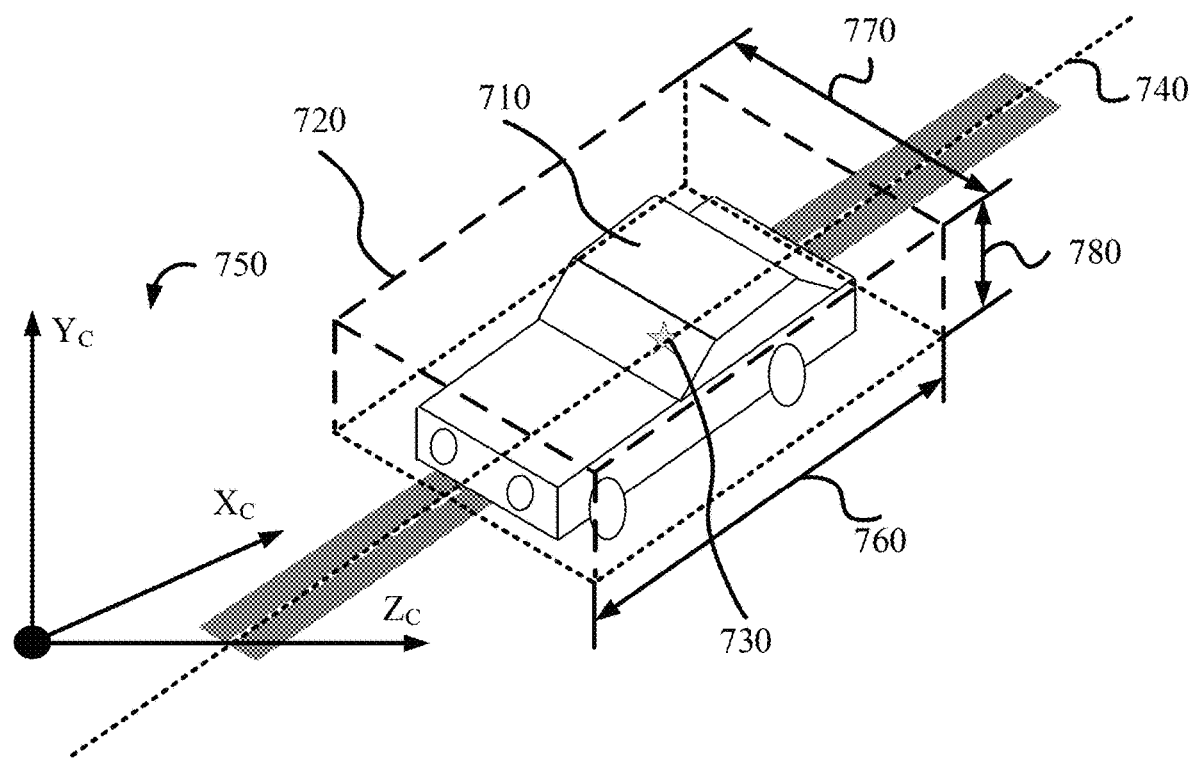
FIG. 7 shows a schematic diagram of a structure of a three-dimensional position of a target to be detected according to an embodiment of the present disclosure.

As shown in FIG. 7, the structure 700 of the three-dimensional position of the target to be detected may include three-dimensional coordinates of a center point 730 of the projection of the target 710 to be detected on the ground in a camera coordinate system 750. A length 760, a width 770, a height 780, and a yaw angle of the target 710 to be detected may also be included. The yaw angle may be, for example, an included angle between an axis 740 of the target to be detected and a coordinate axis $X_C$.

Further, a three-dimensional bounding box 720 of the target 710 to be detected can be obtained from coordinates of the center point 730, the length 760, the width 770, the height 780, and the yaw angle to provide the three-dimensional position of the target 710 to be detected.

Figure 8:
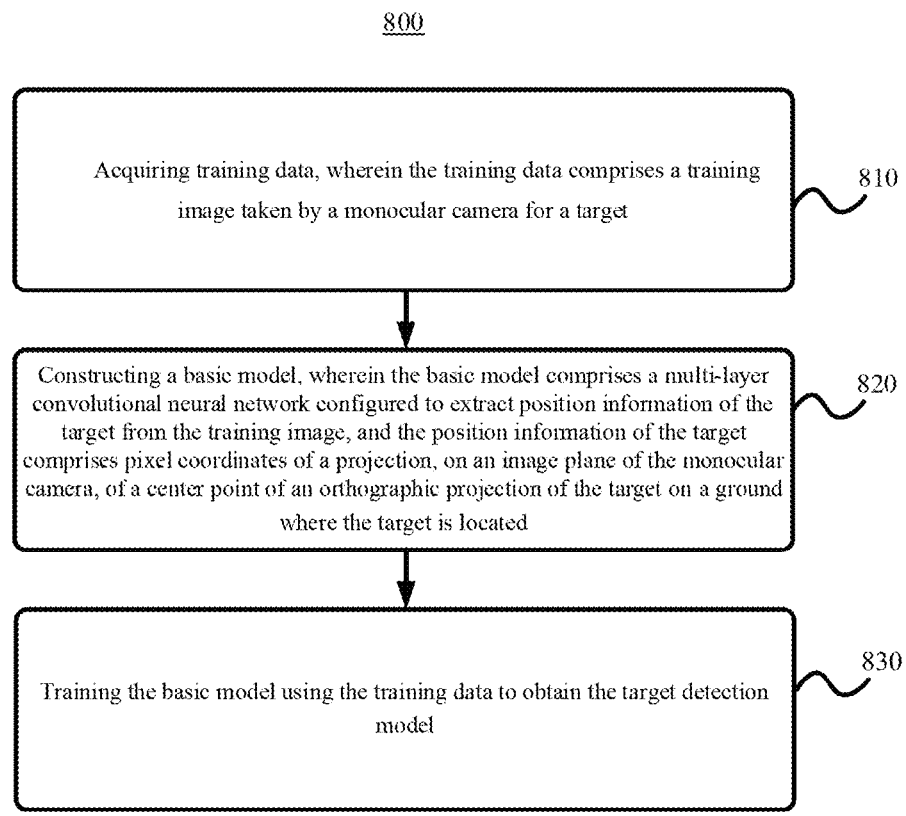
FIG. 8 shows a flowchart of a training method for a target detection model according to an embodiment of the present disclosure.

FIG. 8 shows a flowchart of a training method 800 for a target detection model according to an embodiment of the present disclosure. As shown in FIG. 8, the training method 800 for the target detection model may include step 810 to step 830.

In step 810, training data may be acquired, wherein the training data include a training image taken by a monocular camera for a target. For example, the target detection model may detect position information of the target in the training image. The training data may further include, for example, a label corresponding to the training image, and the label may represent a true position of the target in the training image.

In step 820, a basic model may be constructed, wherein the basic model includes a multi-layer convolutional neural network. The multi-layer convolutional neural network is configured to extract position information of the target from the training image, and the position information of the target includes a pixel coordinate of a projection, on an image plane of the monocular camera, of a center point of an orthographic projection of the target on a ground where the target is located.

For example, the basic model may include the multi-layer convolutional neural network. The multi-layer convolutional neural network may perform multiple convolutions on the training image input to the model and extract the position information of the target. For example, it may be assumed that the ground where the target is located is a plane, and the position information of the target extracted from the training image may include pixel coordinates of a projection point, onto the camera image plane, of a center point of an orthographic projection of the target on the ground plane. For example, when the position of the target changes greatly in the three-dimensional world coordinate system, the pixel coordinates of the image projection point corresponding to the center point on the training image may change very little.

In step 830, the basic model can be trained using the training data to obtain a target detection model. For example, the multi-layer convolutional neural network may learn to update a weight value of the neural network by returning the position information of the target. For example, by continuously inputting the training image to the target detection model and iteratively updating the weight value of the convolutional neural network, the prediction of the convolutional neural network on the position information of the target approximates a true value in the training data, thereby generating the target detection model.

Figure 9A:
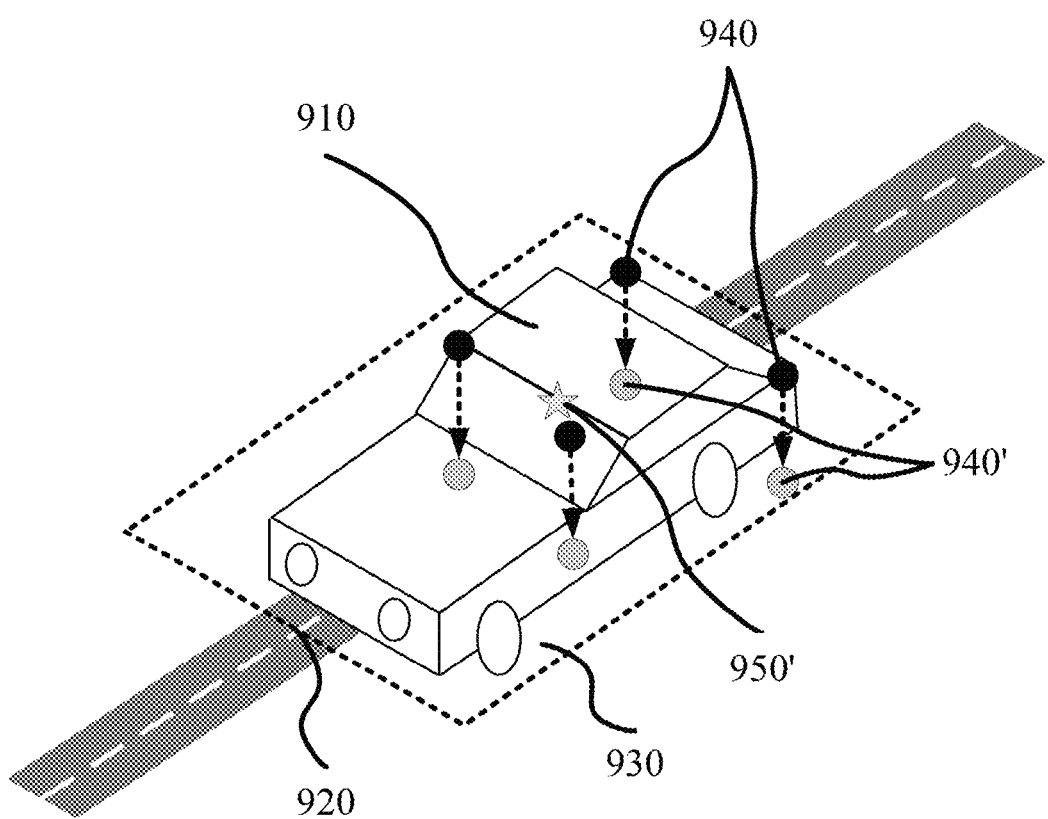
FIG. 9A shows a schematic diagram of a center point of an orthographic projection of a target on a ground according to an embodiment of the present disclosure.

FIG. 9A shows a schematic diagram of an orthographic center point of an orthographic projection of a target on a ground according to the embodiment of the present disclosure. FIG. 9A includes a target 910, a ground 920, an orthographic projection 930 of the target 910 onto the ground 920, a point 940 on the target 910, a projection point 940' of the point 940 onto the ground 920, and a center point 950' of the orthographic projection 930 of the target 910 onto the ground 920.

For example, assuming that the ground 920 is a plane, the point 940 on the target 910 can be projected onto the ground 920 to obtain the projection point 940'. Similarly, the orthographic projection 930 of the target 910 on the ground 920 can be obtained, and the center point 950' of the orthographic projection 930 can be obtained.

Figure 9B:
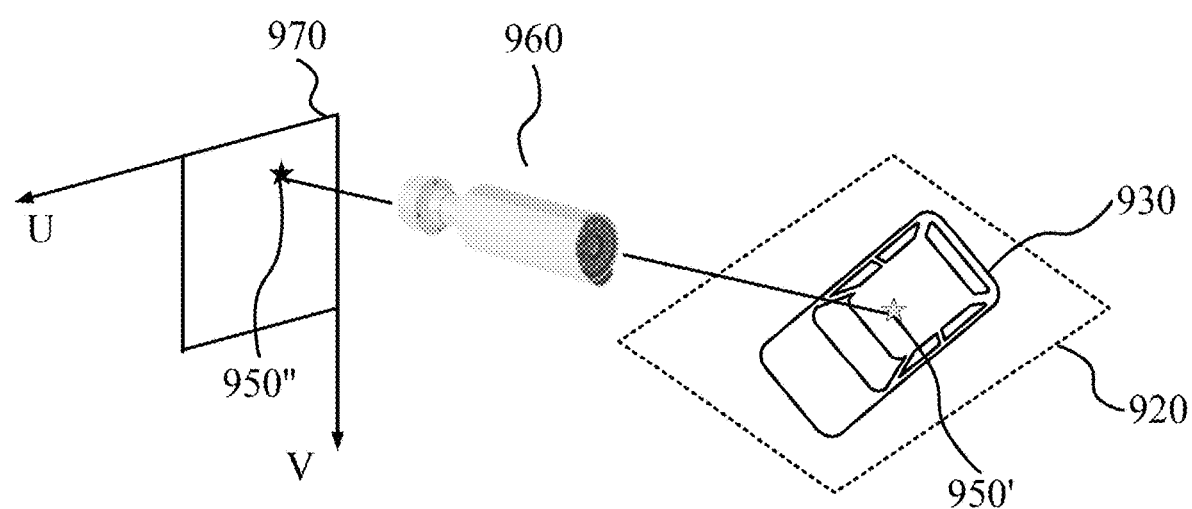
FIG. 9B shows a top view of a projection, onto an image plane, of a center point of an orthographic projection of a target on a ground according to an embodiment of the present disclosure.

FIG. 9B shows a top view of a projection, onto an image plane, of a center point of an orthographic projection of a target on a ground according to the embodiment of the present disclosure. Similar reference numbers in FIG. 9B represent elements similar to those in FIG. 9A, and will not be repeated here.

As shown in FIG. 9B, the center point 950' of the orthographic projection 930 of the target 910 is projected onto an image plane 970 of a camera 960, and an image projection point 950" of the center point 950' is obtained.

For example, a label may be added to the image projection point 950" in the training image in the training data, and two-dimensional pixel coordinates of the image projection point 950" are used to replace three-dimensional coordinates of the projection point 950' as regression parameters.

In summary, according to the training method for the target detection model provided by the embodiment of the present disclosure, the pixel coordinates of the projection, on the image plane, of the center point of the orthographic projection of the target on the ground have relatively small position changes and are used as the regression parameters. Therefore, the difficulty of parameter fitting in the training process of the target detection model can be reduced, and the training speed of the model can be improved. In addition, during the training process of the model, the three-dimensional coordinates of the center point of the orthographic projection of the target on the ground are not regressed, thereby reducing the dependence of the model on the external parameters of the camera and improving the generalization ability of the model.

Figure 10A:
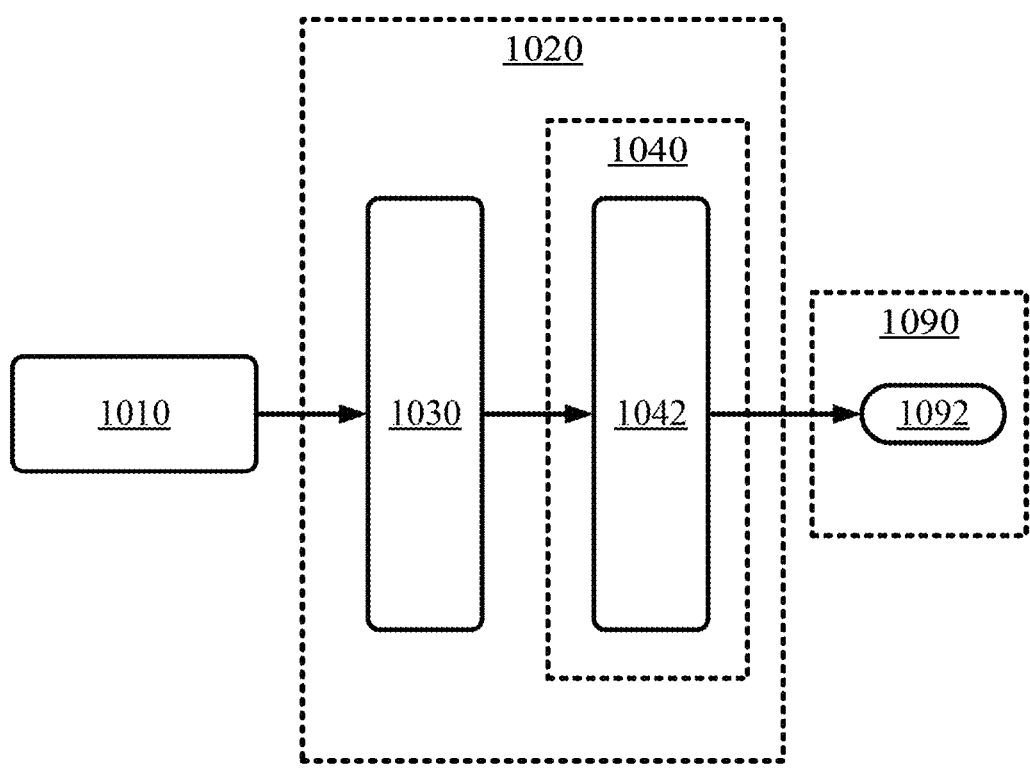
FIGS. 10A-10C show schematic diagrams of a structure of a target detection model according to an embodiment of the present disclosure.
Figure 10B:
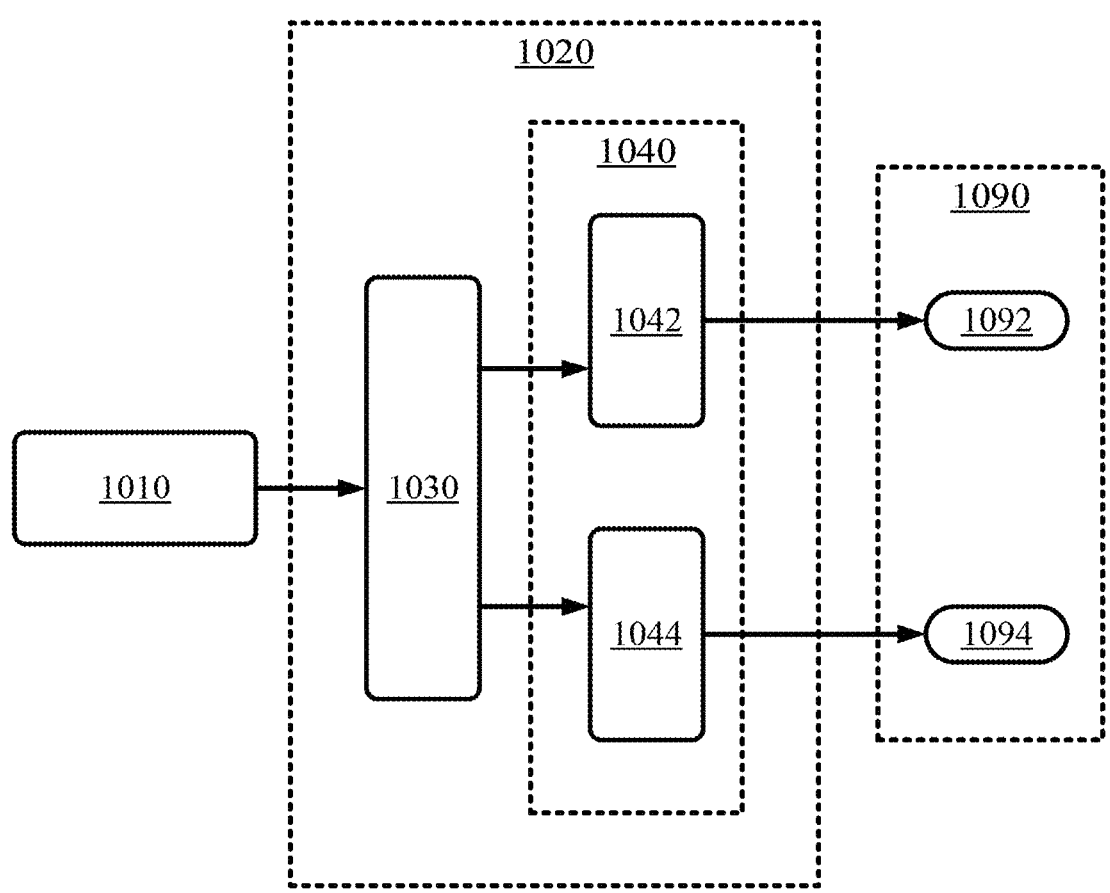
Figure 10C:
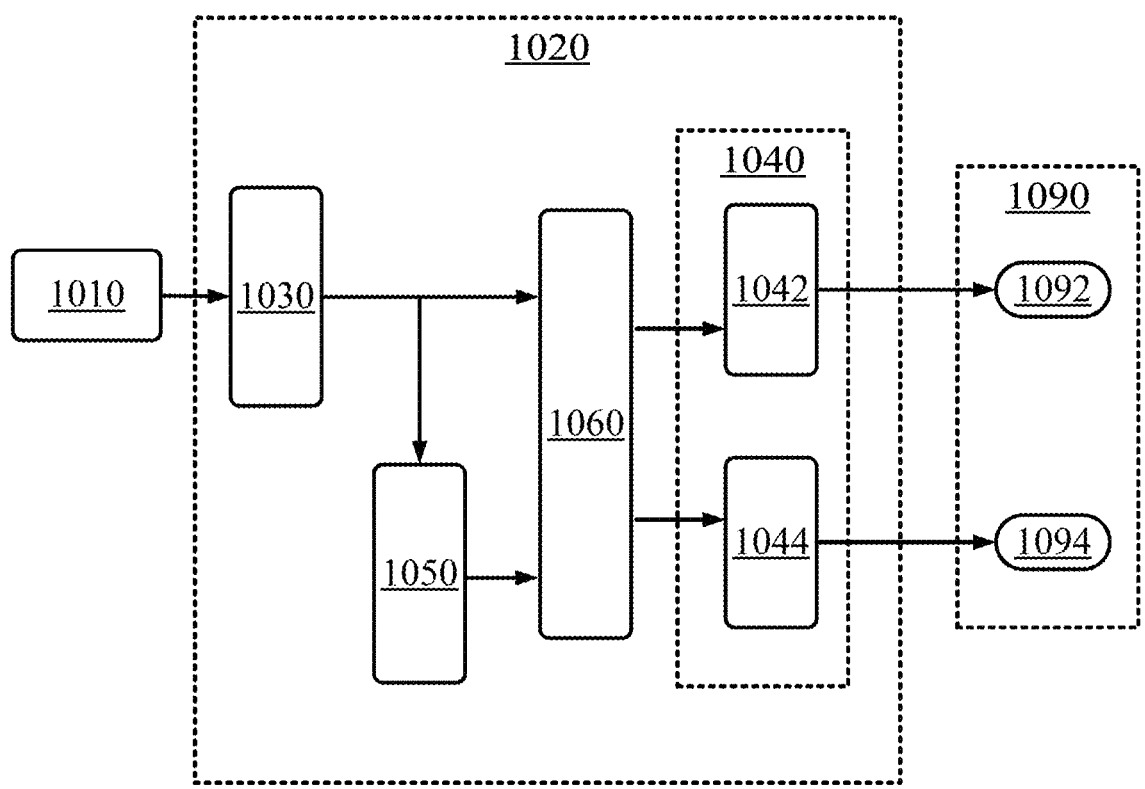

FIGS. 10A-10C show schematic diagrams of a structure of a target detection model 1000A according to an embodiment of the present disclosure. As shown in FIG. 10A, the target detection model 1000A may include a training image 1010, a multi-layer convolutional neural network 1020, and position information 1090 of the target. The multi-layer convolutional neural network 1020 may include an image feature extraction layer 1030. The image feature extraction layer 1030 is configured to extract an image feature from the training image 1010.

The multi-layer convolutional neural network 1020 may further include a target parameter extraction layer 1040. The target parameter extraction layer 1040 is configured to extract the position information 1090 of the target based on the image feature.

In some example embodiments, the target parameter extraction layer 1040 may include a three-dimensional information detection layer 1042. The three-dimensional information detection layer 1042 is configured to detect three-dimensional position information 1092 of the target based on the image feature. The position information 1090 of the target may include the three-dimensional position information 1092 of the target.

In some example embodiments, the three-dimensional position information 1092 of the target may include the length, width, height, and yaw angle of the target in the coordinate system of the monocular camera.

For example, the image feature extraction layer 1030 may be any image feature extraction network in related art, such as a visual geometric group network (VGG), a residual network (ResNet), and a mobile neural network (MobileNet).

For example, the three-dimensional information detection layer 1042 may be any network based on three-dimensional information of a monocular vision detection target in related art, such as a first-order neural network YOLO (You Only Look Once), and a feature-pyramid-based SSD (Single Shot MultiBox Detector) network, and an AnchorBased network.

In summary, the multi-layer convolutional neural network 1020 further includes the image feature extraction layer 1030 and the target parameter extraction layer 1040. The image feature extraction layer 1030 may extract the image feature using a mature two-dimensional target feature extraction technique in related art. Further, the image feature is input to the target parameter extraction layer 1040 to extract target position information including, for example, pixel coordinates of an image projection point of the center point of the orthographic projection of a target on the ground. The target parameter extraction layer 1040 extracts two-dimensional pixel points as regression parameters, thus avoiding the problem of difficult collection and calibration of the training set that extracts three-dimensional coordinates as regression parameters.

FIG. 10B shows a schematic diagram of a structure of a target detection model 1000B according to another embodiment of the present disclosure. Similar reference numbers in FIG. 10B represent elements similar to those in FIG. 10A, and will not be repeated here. As shown in FIG. 10B, the target parameter extraction layer 1040 further includes a two-dimensional information detection layer 1044. The two-dimensional information detection layer 1044 is configured to detect two-dimensional position information 1094 of a target image, projected on the image plane of the monocular camera, of a target in the image plane coordinate system of the monocular camera, based on the image feature. In addition, the position information 1090 of the target may further include the two-dimensional position information 1094 of the target.

In some example embodiments, the two-dimensional position information 1094, which is detected by the two-dimensional information detection layer 1044, of the target image on the image plane may include a height and a width of the target image in the image plane coordinate system, the pixel coordinate of a center point of the target image, a confidence level and a score; in addition, the height and width of the target image in the image plane coordinate system and the pixel coordinates of the center point of the target image may represent a two-dimensional bounding box of the target image. For example, the confidence level may represent the proximity between the two-dimensional bounding box and a real two-dimensional bounding box in the training data. Further illustratively, the score may represent a degree of overlap between the two-dimensional bounding box and the real two-dimensional bounding box.

In summary, according to the training method for the target detection model in the embodiments of the present disclosure, by introducing the two-dimensional information detection layer 1044 into the target parameter extraction layer 1040, the two-dimensional position information of the target in the training image is added to the position information of the target, thereby enriching the information that the target detection model can predict. In addition, by constructing a two-dimensional bounding box of the target, the two-dimensional position information of the bounding box and the geometric constraints of the target can be used to improve the accuracy of predicting the three-dimensional position of the target.

FIG. 10C shows a schematic diagram of a structure of a target detection model 1000C according to another embodiment of the present disclosure. Similar reference numbers in FIG. 10C represent elements similar to those in FIGS. 10A and 10B, and will not be repeated here. As shown in FIG. 10C, the multi-layer convolutional neural network 1020 further includes a region candidate network layer 1050. The region candidate network layer 1050 is configured to detect an image candidate region of the target based on the image feature.

The multi-layer convolutional neural network 1020 further includes a candidate region pooling layer 1060. The candidate region pooling layer 1060 is configured to extract and input a feature of the image candidate region to the target parameter extraction layer 1040 based on the image feature and the image candidate region.

For example, the region candidate network layer 1050 may make a preliminary position estimation on a region containing the target image and may be trained as a single first-order model, so that the target detection model 1000C may be a second-order detection model.

For example, the region candidate network layer 1050 may be any network that extracts a target candidate region in related art, such as RPN networks (Region Proposal Networks).

For example, the candidate region pooling layer 1060 may be any network in the related art that extracts a candidate region feature according to the target candidate region and the image feature, such as an ROI (Region Of Interest) Pooling network.

In summary, by further adding the region candidate network layer 1050 and the candidate region pooling layer 1060 to the multi-layer convolutional neural network 1020, the image candidate region output by the region candidate network layer 1050 and the image feature extracted by the image feature extraction layer 1030 can be input to the candidate region pooling layer 1060 to obtain the image feature of the candidate region. The candidate network layer 450 and the candidate region pooling layer 1060 limit the detection of the target to the region that may contain the target image, so that a subsequent detection operation only needs to be performed in the candidate region, speeding up the detection of the three-dimensional position information and/or the two-dimensional position information of the target.

Figure 11:
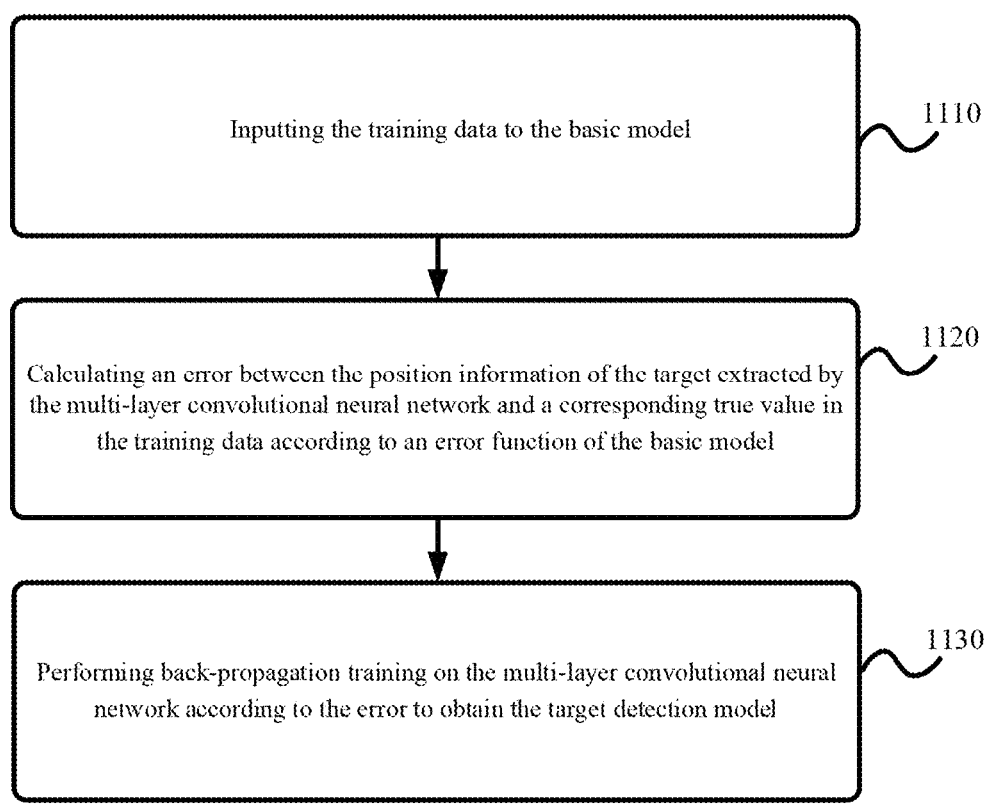
FIG. 11 shows a flowchart of an example process of training a basic model in the method of FIG. 8 according to an embodiment of the present disclosure.

FIG. 11 shows a flowchart of an example process of training a basic model (step 830) in the method 800 of FIG. 8 according to an embodiment of the present disclosure. As shown in FIG. 8, step 830 of training the basic model using the training data to obtain a target detection model further includes step 1110 to step 1130.

Step 1110, the training data are input to the basic model.

Step 1120, an error is calculated between the position information of the target extracted by the multi-layer convolutional neural network and a corresponding true value in the data according to an error function of the basic model.

Step 1130, back-propagation training is performed on the multi-layer convolutional neural network according to the error to obtain the target detection model.

For example, training data can be input and the weight parameters of the multi-layer convolutional neural network can be initialized. Then data is input into the model in batches for forward propagation. Next, an error between the position information of the target predicted by the model and the true value identified in the training data is calculated. Further, an error gradient is propagated back and the weight value is updated. Finally, the iteration is repeated to bring the error gradient to zero. For example, the error function of the model can be designed as the Euclidean distance between the predicted position information of the target of the model and the true value.

In summary, by continuously iteratively updating the weight parameters of the multi-layer convolutional neural network, the predicted output of the target detection model can be made close to the true value. Also, because the parameters of the convolutional neural network used for regression in the training process are the target position information including image projection coordinates of the center point of the orthographic projection of the target, the training convergence speed is fast while increasing the generalization ability of the target detection model.

Figure 12A:
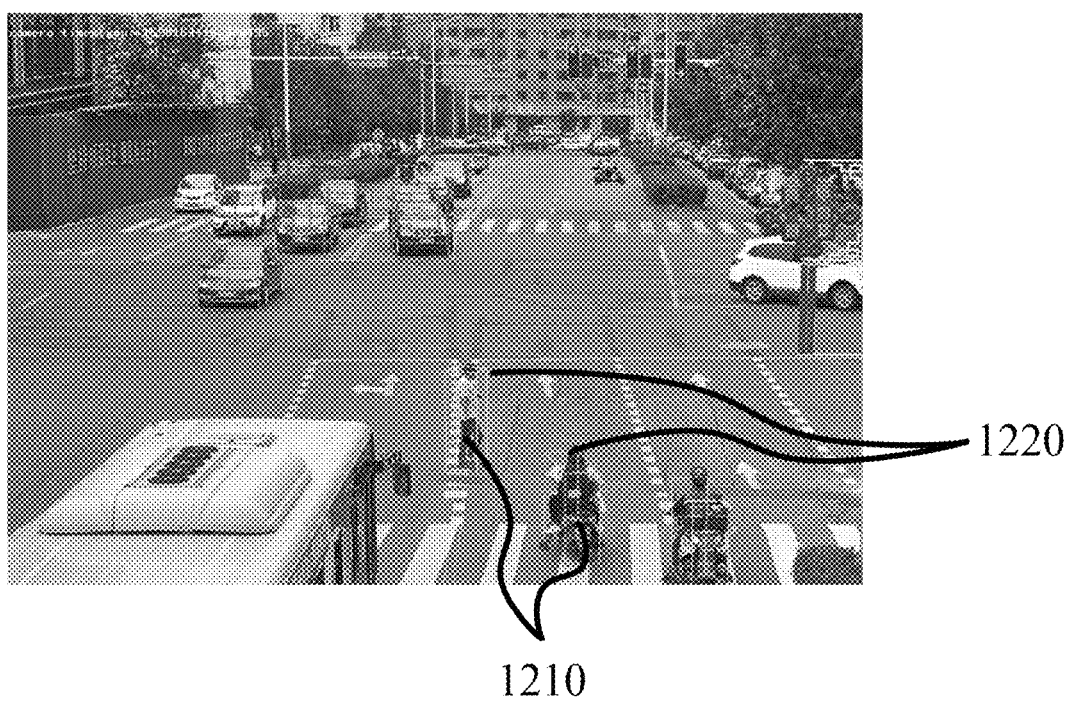
FIGS. 12A-12B show schematic diagrams of detecting an example target by the target detection method according to the embodiment of the present disclosure.
Figure 12B:
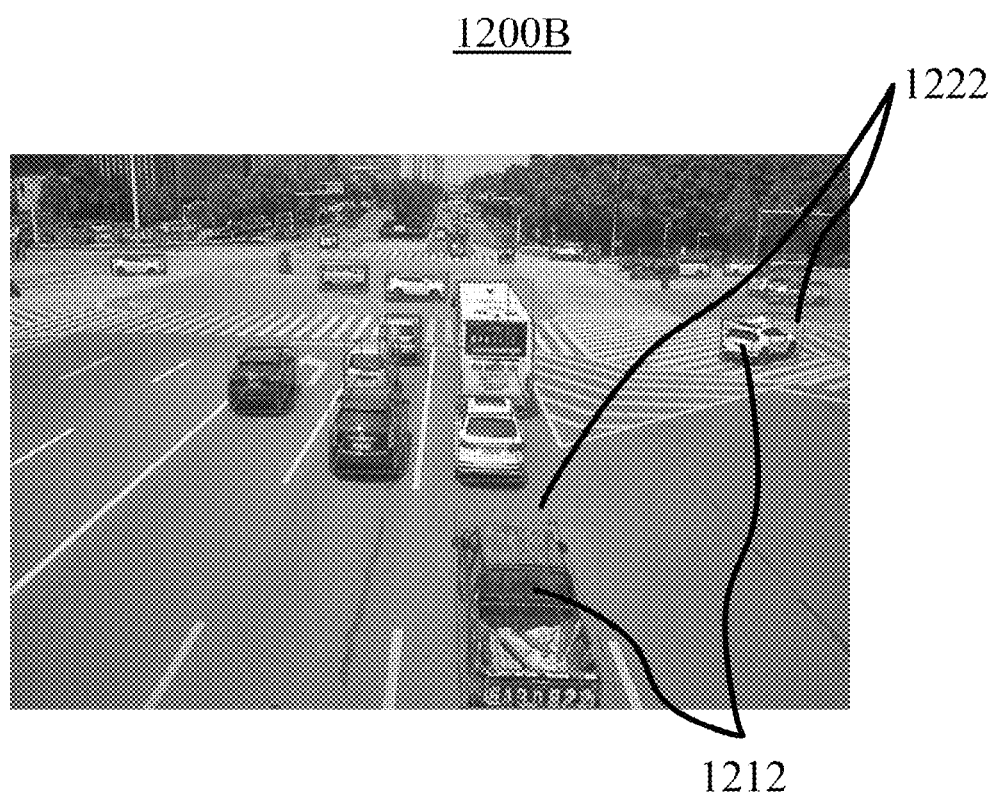

FIGS. 12A-12B show schematic diagrams of detecting an example target by the target detection method according to the embodiment of the present disclosure.

In FIG. 12A, a scene 1200A is detected using a trained target detection model. A detection result is shown in FIG. 12A, and a three-dimensional position of a target 1210 to be detected includes a three-dimensional bounding box 1220.

In FIG. 12B, a scene 1200B is detected using the same target detection model. A detection result is shown in FIG. 12B, and a three-dimensional position of a target 1212 to be detected includes a three-dimensional bounding box 1222.

It can be seen that for the same target detection model, the three-dimensional position of the target can still be detected in the case of different scenes and external parameters.

Figure 13A:
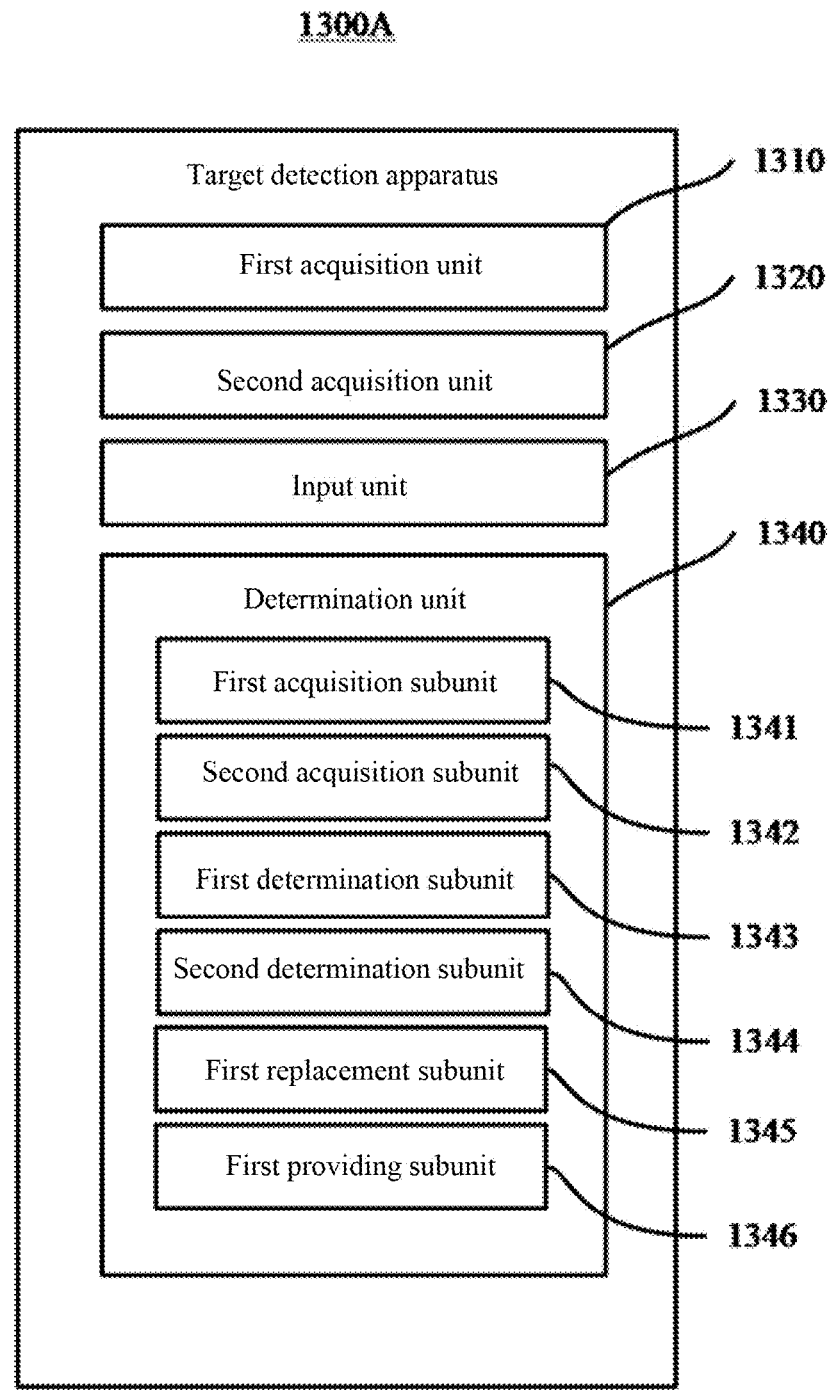
FIGS. 13A-13B show block diagrams of a target detection apparatus according to an embodiment of the present disclosure.
Figure 13B:
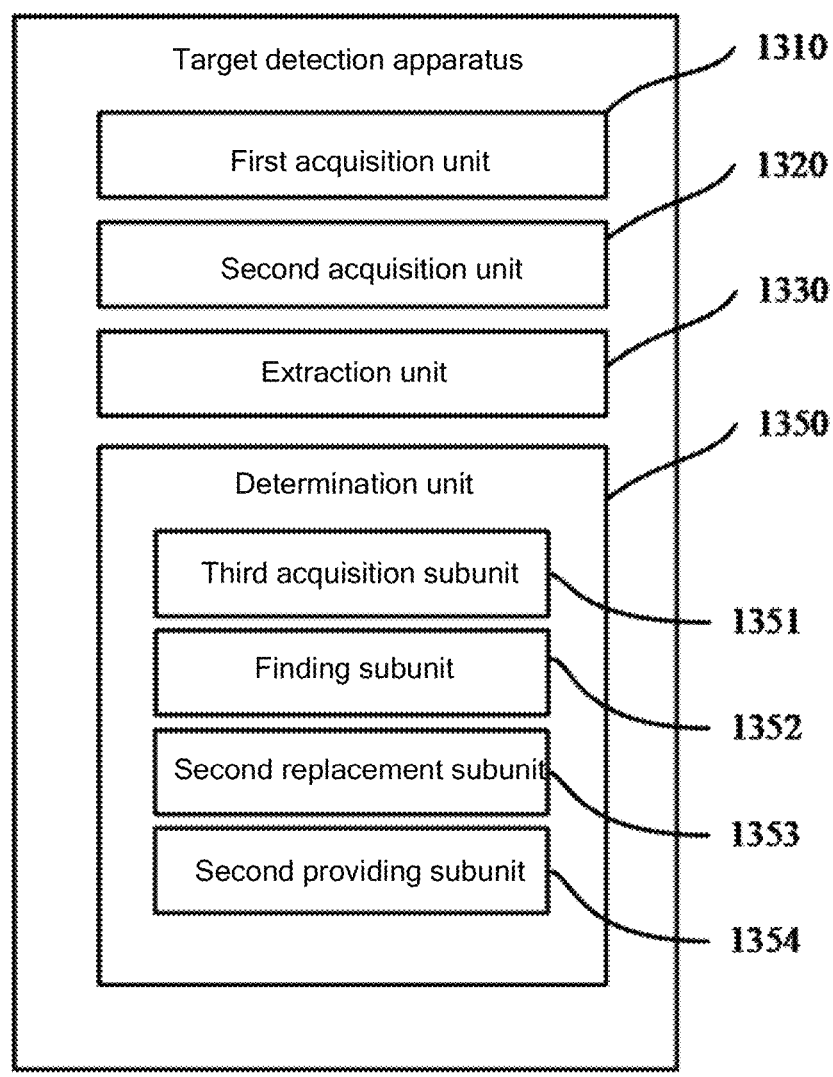

FIGS. 13A-13B show block diagrams of a target detection apparatus 1300A according to an embodiment of the present disclosure. As shown in FIG. 13A, the target detection apparatus 1300A includes: a first acquisition unit 1310 configured to acquire a detection image of a target to be detected, wherein the detection image is an image taken by a detection monocular camera for the target to be detected; a second acquisition unit 1320 configured to acquire a target detection model, wherein the target detection model is configured to extract position information of the target to be detected from the detection image, and the position information of the target to be detected includes a pixel coordinate of a projection, on an image plane of the detection monocular camera, of a center point of an orthographic projection of the target to be detected on a ground where the target to be detected is located; an input unit 1330 configured to input the detection image into the target detection model to extract the position information of the target to be detected; and a determination unit 1340 configured to determine a three-dimensional position of the target to be detected based on the position information of the target to be detected.

In some example embodiments, the determination unit 1340 may include:
- a first acquisition subunit 1341 configured to acquire internal parameters of the detection monocular camera;
- a second acquisition subunit 1342 configured to acquire external parameters of the detection monocular camera, wherein the external parameters include parameters of a plane equation of the ground where the target to be detected is located in the coordinate system of the detection monocular camera;
- a first determination subunit 1343 configured to determine, based on the internal parameters of the detection monocular camera and the position information of the target to be detected, a straight line which passes through an origin of the coordinate system of the detection monocular camera and the pixel coordinates of the projection, on the image plane of the detection monocular camera, of the center point of the orthographic projection of the target to be detected on the ground in the position information, wherein coordinates of the center point of the orthographic projection of the target to be detected on the ground in the coordinate system of the detection monocular camera are on the straight line;
- a second determination subunit 1344 configured to determine, based on the straight line and the parameters of the plane equation of the ground, a coordinate of an intersection point of the straight line and the ground in the coordinate system of the detection monocular camera, as the coordinate of the center point of the orthographic projection of the target to be detected on the ground in the coordinate system of the detection monocular camera;
- a first replacement subunit 1345 configured to replace the pixel coordinates of the projection, on the image plane of the detection monocular camera, of the center point of the orthographic projection in the position information of the target to be detected with the coordinates of the center point of the orthographic projection in the coordinate system of the detection monocular camera; and a first providing subunit 1346 configured to provide the replaced position information of the target to be detected as the three-dimensional position of the target to be detected.

FIG. 13B shows a block diagram of a target detection apparatus 1300B according to another embodiment of the present disclosure. Similar reference numbers in FIG. 13B represent elements similar to those in FIG. 13A, and will not be repeated here.

As shown in FIG. 13B, the determination unit 1350 may include:
- a third acquisition subunit 1351 configured to acquire a ground depth map of the ground where the target to be detected is located, wherein the ground depth map represents a mapping relationship between a coordinate of a point in the ground in the coordinate system of the detection monocular camera and the pixel coordinate of a projection, on the image plane of the detection monocular camera, of the point.
- a searching subunit 1352 configured to search, based on the ground depth map, coordinates in the coordinate system of the detection monocular camera for the pixel coordinate of the projection, on the image plane of the detection monocular camera, of the center point of the orthographic projection of the target to be detected on the ground in the position information of the target to be detected.
- a second replacement subunit 1353 configured to replace the pixel coordinates of the projection, on the image plane of the detection monocular camera, of the center point of the orthographic projection in the position information of the target to be detected with the coordinate of the center point of the orthographic projection in the coordinate system of the detection monocular camera; and
- a second providing subunit 1354 configured to provide the replaced position information of the target to be detected as the three-dimensional position of the target to be detected.

Figure 14:
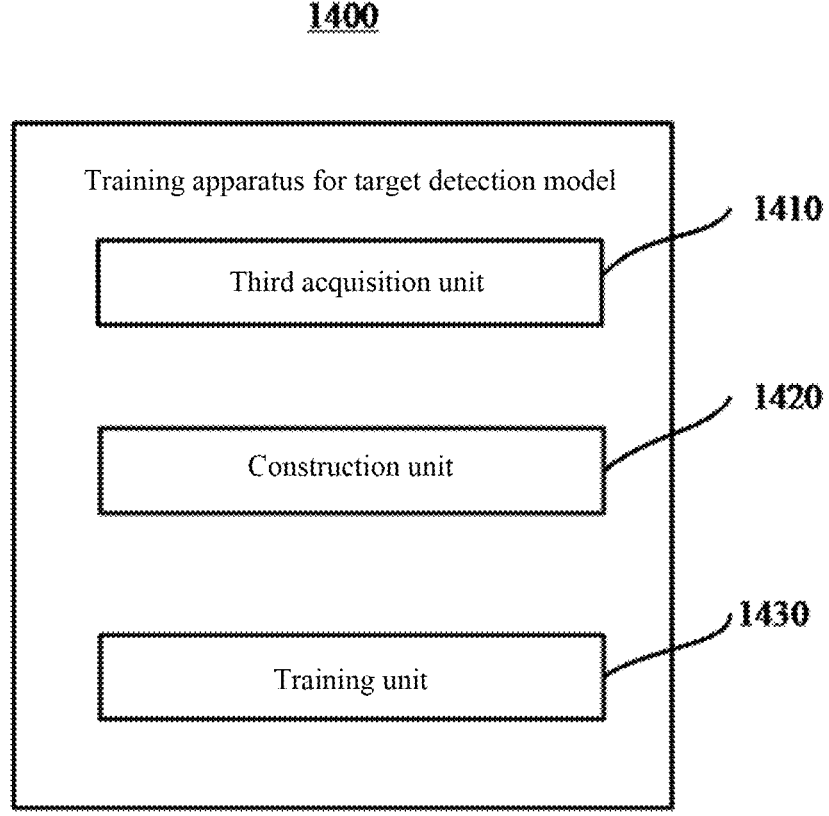
FIG. 14 shows a block diagram of a training apparatus for a target detection model according to an embodiment of the present disclosure.

FIG. 14 shows a block diagram of a training apparatus 1400 for a target detection model according to an embodiment of the present disclosure. As shown in FIG. 14, the training apparatus 1400 for the target detection model includes: a third acquisition unit 1410 configured to acquire training data, wherein the training data include a training image taken by a monocular camera for a target; a construction unit 1420 configured to construct a basic model, wherein the basic model includes a multi-layer convolutional neural network configured to extract position information of the target from the training image, and the position information of the target includes a pixel coordinate of a projection, on an image plane of the monocular camera, of a center point of an orthographic projection of the target on a ground where the target is located; and a training unit 1430 configured to train the basic model using the training data to obtain a target detection model.

It should be understood that the units and subunits of the apparatuses 1300A and 1300B shown in FIGS. 13A-13B may correspond to the steps in the method 200 described with reference to FIGS. 2 to 7. Therefore, the operations, features and advantages described above regarding the method 200 are also applicable to the apparatuses 1300A and 1300B and the units and subunits included therein, and will not be repeated for the sake of brevity.

It should be understood that the units and subunits of the apparatus 1400 shown in FIG. 14 may correspond to the steps in the method 800 described with reference to FIGS. 8 to 11. Therefore, the operations, features and advantages described above regarding the method 800 are also applicable to the apparatus 1400 and the units and subunits included therein, and will not be repeated for the sake of brevity.

Although specific functions are discussed above with reference to specific units, it should be noted that the functions of the units discussed herein may be divided into multiple units, and/or at least some functions of multiple units may be combined into a single unit. A specific unit performing an action discussed herein includes the specific unit itself performing the action, or alternatively the specific unit calling or otherwise accessing another component or unit that performs the action (or performing the action in conjunction with the specific unit) in an another manner. Therefore, the specific unit performing the action may include the specific unit itself performing the action and/or another unit that is called or accessed in another manner by the specific unit to perform the action.

Various techniques may be described herein in the general context of software hardware elements or program modules. The units and subunits described above may be implemented in hardware or in hardware combined with software and/or firmware. For example, these units and subunits may be implemented as computer program codes/instructions, and the computer program codes/instructions are configured to be executed in one or more processors and stored in a computer-readable storage medium. Alternatively, these modules can be implemented as hardware logic/circuitry. For example, one or more of the units and sub-units may be implemented together in a system on chip (SoC). The SoC may include an integrated circuit chip (which includes a processor (for example, a central processing unit (CPU), a microcontroller, a microprocessor, a digital signal processor (DSP)), a memory, one or more communication interfaces, and/or one or more components in other circuits), and can for example execute the received program code and/or include embedded firmware to perform functions.

According to another aspect of the present disclosure, provided is an electronic device, including: a memory, a processor, and a computer program stored on the memory, wherein the processor is configured to execute the computer program to implement the steps of the above method of the present disclosure.

According to another aspect of the present disclosure, provided is a non-transitory computer-readable storage medium with a computer program stored thereon, wherein the computer program, when executed by a processor, implements the steps of the above method in the present disclosure.

According to another aspect of the present disclosure, provided is a computer program product, including a computer program, wherein the computer program, when executed by a processor, implements the steps of the above method in the present disclosure.

Figure 15:
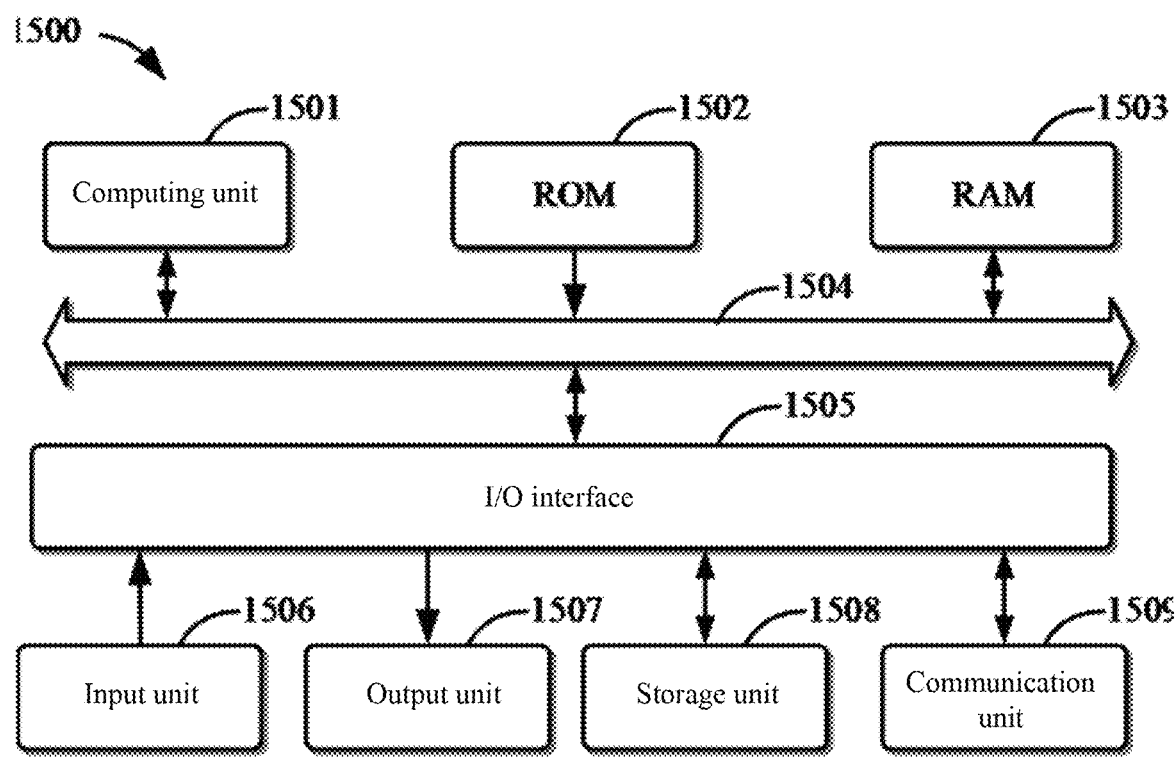
FIG. 15 shows a structural block diagram of an example electronic device that can be used to implement an embodiment of the present disclosure.

Examples of such electronic device, non-transitory computer readable storage medium, and computer program product are described below in connection with FIG. 15. FIG. 15 shows a structural block diagram of an example electronic device 1500 that can be used to implement an embodiment of the present disclosure.

Referring to FIG. 15, a structural block diagram of the electronic device 1500 that can be used as a server or a client of the present disclosure will now be described, which is an example of a hardware device that can be applied to various aspects of the present disclosure. Electronic devices are intended to mean various forms of digital electronic devices, such as laptop computers, desktop computers, workstations, personal digital assistants, servers, blade servers, mainframe computers, and other suitable computers. Electronic devices may also represent various forms of mobile devices, such as personal digital processing devices, cellular phones, smart phones, wearable devices, and other similar computing devices. The components shown herein, their connections and relationships, and their functions are merely examples, and are not intended to limit the implementation of the present disclosure described and/or required herein.

As shown in FIG. 15, the device 1500 includes a computing unit 1501 that can perform various appropriate actions and processes according to a computer program stored in a read-only memory (ROM) 1502 or a computer program loaded into a random access memory (RAM) 1503 from a storage unit 1508. In the RAM 1503, various programs and data required for the operation of the device 1500 can also be stored. The computing unit 1501, the ROM 1502 and the RAM 1503 are connected to each other through a bus 1504. An input/output (I/O) interface 1505 is also connected to the bus 1504.

A plurality of components in the device 1500 are connected to the I/O interface 1505, including: an input unit 1506, an output unit 1507, a storage unit 1508, and a communication unit 1509. The input unit 1506 may be any type of device capable of inputting information to the device 1500. The input unit 1506 can receive inputted number or character information, and generate a key signal input related to user settings and/or function control of the electronic device. The input unit 1506 may include, but is not limited to, a mouse, a keyboard, a touch screen, a trackpad, a trackball, a joystick, a microphone, and/or a remote control. The output unit 1507 may be any type of device capable of presenting information, and may include, but is not limited to, a display, a speaker, a video/audio output terminal, a vibrator, and/or a printer. The storage unit 1508 may include, but is not limited to, a magnetic disk and an optical disk. The communication unit 1509 allows the device 1500 to exchange information/data with other devices through a computer network such as the Internet and/or various telecommunication networks. In addition, the communication unit 1509 may include, but is not limited to, a modem, a network card, an infrared communication device, a wireless communication transceiver, and/or a chipset, such as a Bluetooth™ device, a 1302.11 device, a WiFi device, a WiMax device, a cellular communication device, and/or the like.

The computing unit 1501 may be various general-purpose and/or special-purpose processing components with processing and computing capabilities. Some examples of the computing unit 1501 include but are not limited to central processing units (CPUs), graphics processing units (GPUs), various dedicated artificial intelligence (AI) computing chips, various computing units running machine learning model algorithms, digital signal processors (DSPs), and any appropriate processors, controllers, microcontrollers, etc. The computing unit 1501 executes the various methods and processes described above, for example, one or both of the method 200 and the method 600. For example, in some embodiments, one or both of the method 200 and the method 600 may be implemented as a computer software program, which is tangibly contained in a machine-readable medium, such as the storage unit 1508. In some embodiments, part or all of the computer program may be loaded and/or installed on the device 1500 via the ROM 1502 and/or the communication unit 1509. When the computer program is loaded into the RAM 1503 and executed by the computing unit 1501, one or more steps in one or both of the method 200 and the method 800 described above may be executed. Alternatively, in other embodiments, the computing unit 1501 may be configured to perform one or both of the method 200 and the method 800 in any other suitable manner (for example, by means of firmware).

Various implementations of the systems and techniques described herein above can be implemented in digital electronic circuit systems, integrated circuit systems, field programmable gate arrays (FPGAs), application specific integrated circuits (ASICs), application specific standard products (ASSPs), systems on chip (SOC), complex programmable logic devices (CPLD), computer hardware, firmware, software, and/or combinations thereof. These various implementations may include: implementation in one or more computer programs. The one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and instructions to the storage system, the at least one input device, and the at least one output device.

Program codes for implementing the methods of the present disclosure can be written in any combination of one or more programming languages. These program codes may be provided to the processor or controller of a general-purpose computer, special-purpose computer, or other programmable data processing device, so that the program codes, when executed by the processor or the controller, cause the functions/operations specified in the flowchart and/or block diagram to be implemented. The program codes can be executed completely on a machine, partially on the machine, partially on the machine as an independent software package and partially on a remote machine, or completely on the remote machine or a server.

In the context of the present disclosure, a machine-readable medium may be a tangible medium, which may contain or store a program for use by an instruction execution system, apparatus or device, or use in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and techniques described here can be implemented on a computer that has: a display device for displaying information to the user (for example, a CRT (cathode ray tube) or LCD (liquid crystal display) monitor)); and a keyboard and a pointing device (for example, a mouse or a trackball) through which the user can provide an input to the computer. Other types of devices can also be used to provide interaction with the user; for example, the feedback provided to the user can be any form of sensory feedback (for example, visual feedback, auditory feedback, or tactile feedback); and can receive the input from the user in any form (including acoustic input, voice input, or tactile input).

The systems and techniques described here can be implemented in a computing system that includes a back-end component (for example, as a data server), or a computing system that includes a middleware component (for example, an application server), or a computing system that includes a front-end component (for example, a user computer with a graphical user interface or web browser through which the user can interact with the implementation of the systems and techniques described here), or a computing system that includes any combination of such back-end component, middleware component or front-end component. The components of a system can be connected to each other through any form or medium of digital data communication (for example, a communication network). Examples of the communication network include: a local area network (LAN), a wide area network (WAN) and the Internet.

The computer system may include a client and a server. The client and server are generally far away from each other and usually interact through a communication network. A relationship between the client and the server is generated by computer programs that run on the corresponding computers and have a client-server relationship with each other.

It should be understood that steps can be reordered, added or removed using the various forms of processes shown above. For example, the steps described in the present disclosure may be executed in parallel, sequentially or in a different order, as long as the desired result of the technical solution disclosed in the present disclosure can be achieved, which is not limited herein.

According to an aspect of the present disclosure, provided is a roadside device, including the above-mentioned electronic device 1500. For example, in addition to the electronic device 1500, the roadside device may also include a communication component, etc. The electronic device 1500 may be integrated with the communication component, or may be provided separately. The electronic device 1500 may acquire data of a sensing device (such as a roadside camera), such as a picture and a video, thereby performing image video processing and data computation.

According to an aspect of the present disclosure, provided is a cloud control platform, including the above-mentioned electronic device 1500. For example, the cloud control platform performs processing in the cloud, and the electronic device 1500 included in the cloud control platform may acquire data of a sensing device (such as a roadside camera), such as a picture and a video, thereby performing image video processing and data computation. The cloud control platform can also be called a vehicle-road collaborative management platform, an edge computing platform, a cloud computing platform, a central system, a cloud server, etc.

Although the embodiments or examples of the present disclosure have been described with reference to the drawings, it should be understood that the above-mentioned methods, systems and devices are merely example embodiments or examples, and the scope of the present disclosure is not limited by these embodiments or examples, but only limited by the scope of the granted claims and equivalents thereof. Various elements in the embodiments or examples may be omitted or may be replaced by equivalent elements. In addition, the steps may be performed in an order different from that described in the present disclosure. Further, various elements in the embodiments or examples can be combined in various ways. Importantly, as technology evolves, many elements described herein can be replaced by equivalent elements that emerge after the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A target detection method, comprising:
   acquiring a detection image of a target to be detected, wherein the detection image is an image taken by a detection monocular camera for the target to be detected;
   extracting position information of the target to be detected by inputting the detection image into a target detection model, wherein the target detection model extracts the position information of the target to be detected from the detection image, and the position information of the target to be detected comprises pixel coordinates of a projection, on an image plane of the detection monocular camera, of a center point of an orthographic projection of the target to be detected on a ground where the target to be detected is located; and
   determining a three-dimensional position of the target to be detected based on the position information of the target to be detected, wherein the determining the three-dimensional position of the target includes:
      acquiring internal parameters of the detection monocular camera;
      acquiring external parameters of the detection monocular camera, wherein the external parameters comprise parameters of a plane equation of the ground where the target to be detected is located in a coordinate system of the detection monocular camera;
      determining, based on the internal parameters of the detection monocular camera and the position information of the target to be detected, a straight line which passes through an origin of the coordinate system of the detection monocular camera and the pixel coordinates of the projection, on the image plane of the detection monocular camera, of the center point of the orthographic projection of the target to be detected on the ground in the position information of the target to be detected, wherein coordinates of the center point of the orthographic projection of the target to be detected on the ground in the coordinate system of the detection monocular camera are on the straight line;
      determining, based on the straight line and the parameters of the plane equation of the ground, coordinates of an intersection point of the straight line and the ground in the coordinate system of the detection monocular camera, as the coordinates of the center point of the orthographic projection of the target to be detected on the ground in the coordinate system of the detection monocular camera;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera; and providing the replaced position information of the target to be detected as the three-dimensional position of the target to be detected.

2. The method of claim 1, wherein the determining a three-dimensional position of the target to be detected based on the position information of the target to be detected comprises:

acquiring a ground depth map of the ground where the target to be detected is located, wherein the ground depth map represents a mapping relationship between a coordinate of a point in the ground in a coordinate system of the detection monocular camera and the pixel coordinates of a projection, on the image plane of the detection monocular camera, of the point;

searching, based on the ground depth map, coordinates in the coordinate system of the detection monocular camera for the pixel coordinates of the projection, on the image plane of the detection monocular camera, of the center point of the orthographic projection of the target to be detected on the ground in the position information of the target to be detected;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera; and providing the replaced position information of the target to be detected as the three-dimensional position of the target to be detected.

3. The method of claim 1, wherein the target detection model is obtained by performing operations comprising:

acquiring training data, wherein the training data comprises a training image taken by a training monocular camera for a training target;

constructing a basic model, wherein the basic model comprises a multi-layer convolutional neural network configured to extract position information of the training target from the training image, and the position information of the training target comprises pixel coordinates of a projection, on an image plane of the training monocular camera, of a center point of an orthographic projection of the training target on a ground where the training target is located; and training the basic model using the training data to obtain the target detection model.

4. The method of claim 3, wherein the multi-layer convolutional neural network comprises:

an image feature extraction layer configured to extract an image feature from the training image; and a target parameter extraction layer configured to extract the position information of the training target based on the image feature.

5. The method of claim 4, wherein the target parameter extraction layer comprises:

a three-dimensional information detection layer configured to detect three-dimensional position information of the training target based on the image feature, wherein the position information of the training target further comprises the three-dimensional position information of the training target.

6. The method of claim 5, wherein the three-dimensional position information of the training target comprises a length, a width, a height, and a yaw angle of the target in a coordinate system of the training monocular camera.

7. The method of claim 5, wherein the target parameter extraction layer further comprises:

a two-dimensional information detection layer configured to detect, based on the image feature, two-dimensional position information of a target image of the training target projected on the image plane of the training monocular camera in an image plane coordinate system of the training monocular camera, wherein the position information of the training target further comprises the two-dimensional position information of the training target.

8. The method of claim 7, wherein the two-dimensional position information comprises a height and a width of the target image in the image plane coordinate system, pixel coordinates of a center point of the target image, a confidence level and a score, wherein the height and the width of the target image in the image plane coordinate system and the pixel coordinates of the center point of the target image represent a two-dimensional bounding box of the target image, wherein the confidence level represents proximity between the two-dimensional bounding box and a real two-dimensional bounding box in the training data, and wherein the score represents a degree of overlap between the two-dimensional bounding box and the real two-dimensional bounding box.

9. The method of claim 4, wherein the multi-layer convolutional neural network further comprises:

a region candidate network layer configured to detect an image candidate region of the training target based on the image feature; and a candidate region pooling layer configured to extract and input a feature of the image candidate region to the target parameter extraction layer based on the image feature and the image candidate region.

10. The method of claim 3, wherein the training the basic model using the training data to obtain the target detection model comprises:

inputting the training data to the basic model;

calculating an error between the position information of the target extracted by the multi-layer convolutional neural network and a corresponding true value in the training data according to an error function of the basic model; and performing back-propagation training on the multi-layer convolutional neural network according to the error to obtain the target detection model.

11. An electronic device, comprising:

a memory, a processor, and a computer program stored on the memory, wherein the processor is configured to execute the computer program to implement operations comprising:

acquiring a detection image of a target to be detected, wherein the detection image is an image taken by a detection monocular camera for the target to be detected;

extracting position information of the target to be detected by inputting the detection image into a target detection model, wherein the target detection model extracts the position information of the target to be detected from the detection image, and the position information of the target to be detected comprises pixel coordinates of a projection, on an image plane of the detection monocular camera, of a center point of an orthographic projection of the target to be detected on a ground where the target to be detected is located; and determining a three-dimensional position of the target to be detected based on the position information of the target to be detected, wherein the determining the three-dimensional position of the target includes:

acquiring internal parameters of the detection monocular camera;

acquiring external parameters of the detection monocular camera, wherein the external parameters comprise parameters of a plane equation of the ground where the target to be detected is located in a coordinate system of the detection monocular camera;

determining, based on the internal parameters of the detection monocular camera and the position information of the target to be detected, a straight line which passes through an origin of the coordinate system of the detection monocular camera and the pixel coordinates of the projection, on the image plane of the detection monocular camera, of the center point of the orthographic projection of the target to be detected on the ground in the position information of the target to be detected, wherein coordinates of the center point of the orthographic projection of the target to be detected on the ground in the coordinate system of the detection monocular camera are on the straight line;

determining, based on the straight line and the parameters of the plane equation of the ground, coordinates of an intersection point of the straight line and the ground in the coordinate system of the detection monocular camera, as the coordinates of the center point of the orthographic projection of the target to be detected on the ground in the coordinate system of the detection monocular camera;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera, and providing the replaced position information of the target to be detected as the three-dimensional position of the target to be detected.

12. The device of claim 11, wherein the determining a three-dimensional position of the target to be detected based on the position information of the target to be detected comprises:

acquiring a ground depth map of the ground where the target to be detected is located, wherein the ground depth map represents a mapping relationship between a coordinate of a point in the ground in a coordinate system of the detection monocular camera and the pixel coordinates of a projection, on the image plane of the detection monocular camera, of the point;

searching, based on the ground depth map, coordinates in the coordinate system of the detection monocular camera for the pixel coordinates of the projection, on the image plane of the detection monocular camera, of the center point of the orthographic projection of the target to be detected on the ground in the position information of the target to be detected;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera; and providing the replaced position information of the target to be detected as the three-dimensional position of the target to be detected.

13. The device of claim 11, wherein the computer program, when executed by the processor, further implements operations to obtain the target detection model, comprising:

acquiring training data, wherein the training data comprises a training image taken by a training monocular camera for a training target;

constructing a basic model, wherein the basic model comprises a multi-layer convolutional neural network configured to extract position information of the training target from the training image, and the position information of the training target comprises pixel coordinates of a projection, on an image plane of the training monocular camera, of a center point of an orthographic projection of the training target on a ground where the training target is located; and training the basic model using the training data to obtain the target detection model.

14. A non-transitory computer-readable storage medium having a computer program stored thereon, wherein the computer program, when executed by a processor, implements operations comprising:

acquiring a detection image of a target to be detected, wherein the detection image is an image taken by a detection monocular camera for the target to be detected;

extracting position information of the target to be detected by inputting the detection image into a target detection model, wherein the target detection model extracts the position information of the target to be detected from the detection image, and the position information of the target to be detected comprises pixel coordinates of a projection, on an image plane of the detection monocular camera, of a center point of an orthographic projection of the target to be detected on a ground where the target to be detected is located; and determining a three-dimensional position of the target to be detected based on the position information of the target to be detected, wherein the determining the three-dimensional position of the target includes:

acquiring internal parameters of the detection monocular camera;

acquiring external parameters of the detection monocular camera, wherein the external parameters comprise parameters of a plane equation of the ground where the target to be detected is located in a coordinate system of the detection monocular camera;

determining, based on the internal parameters of the detection monocular camera and the position information of the target to be detected, a straight line which passes through an origin of the coordinate system of the detection monocular camera and the pixel coordinates of the projection, on the image plane of the detection monocular camera, of the center point of the orthographic projection of the target to be detected on the ground in the position information of the target to be detected, wherein coordinates of the center point of the orthographic projection of the target to be detected on the ground in the coordinate system of the detection monocular camera are on the straight line;

determining, based on the straight line and the parameters of the plane equation of the ground, coordinates of an intersection point of the straight line and the ground in the coordinate system of the detection monocular camera, as the coordinates of the center point of the orthographic projection of the target to be detected on the ground in the coordinate system of the detection monocular camera;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera, and providing the replaced position information of the target to be detected as the three-dimensional position of the target to be detected.

15. The medium of claim 14, wherein the determining a three-dimensional position of the target to be detected based on the position information of the target to be detected comprises:

acquiring a ground depth map of the ground where the target to be detected is located, wherein the ground depth map represents a mapping relationship between a coordinate of a point in the ground in a coordinate system of the detection monocular camera and the pixel coordinates of a projection, on the image plane of the detection monocular camera, of the point;

searching, based on the ground depth map, coordinates in the coordinate system of the detection monocular camera for the pixel coordinates of the projection, on the image plane of the detection monocular camera, of the center point of the orthographic projection of the target to be detected on the ground in the position information of the target to be detected;

replacing the pixel coordinates of the projection, on the image plane of the detection monocular camera, of the center point of the orthographic projection in the position information of the target to be detected with the coordinates of the center point of the orthographic projection in the coordinate system of the detection monocular camera; and providing the replaced position information of the target to be detected as the three-dimensional position of the target to be detected.

16. A roadside device, comprising the electronic device according to claim 11.

17. A cloud control platform, comprising the electronic device according to claim 11.

18. The device of claim 13, wherein the multi-layer convolutional neural network comprises:

an image feature extraction layer configured to extract an image feature from the training image; and a target parameter extraction layer configured to extract the position information of the training target based on the image feature.

19. The device of claim 18, wherein the target parameter extraction layer comprises:

a three-dimensional information detection layer configured to detect three-dimensional position information of the training target based on the image feature, wherein the position information of the training target further comprises the three-dimensional position information of the training target.

20. The device of claim 19, wherein the three-dimensional position information of the training target comprises a length, a width, a height, and a yaw angle of the target in a coordinate system of the training monocular camera.

* * * * *